(12) United States Patent
Park et al.

(10) Patent No.: US 11,323,892 B2
(45) Date of Patent: May 3, 2022

(54) METHOD FOR TRANSMITTING AND RECEIVING DATA ON BASIS OF QCL IN WIRELESS COMMUNICATION SYSTEM, AND DEVICE THEREFOR

(71) Applicant: LG Electronics Inc., Seoul (KR)

(72) Inventors: Jonghyun Park, Seoul (KR); Jiwon Kang, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/651,484

(22) PCT Filed: Oct. 1, 2018

(86) PCT No.: PCT/KR2018/011642
§ 371 (c)(1),
(2) Date: Mar. 27, 2020

(87) PCT Pub. No.: WO2019/066618
PCT Pub. Date: Apr. 4, 2019

(65) Prior Publication Data
US 2020/0267571 A1  Aug. 20, 2020

Related U.S. Application Data

(60) Provisional application No. 62/621,553, filed on Jan. 24, 2018, provisional application No. 62/587,435, (Continued)

(51) Int. Cl.
*H04W 16/28* (2009.01)
*H04W 76/27* (2018.01)
(Continued)

(52) U.S. Cl.
CPC .............. *H04W 16/28* (2013.01); *H04B 7/01* (2013.01); *H04L 5/0051* (2013.01); *H04W 8/24* (2013.01);
(Continued)

(58) Field of Classification Search
CPC ... H04W 16/28; H04W 76/27; H04W 72/042; H04W 72/0446; H04W 72/046; H04W 48/12; H04B 7/01
See application file for complete search history.

(56) References Cited

U.S. PATENT DOCUMENTS

2014/0092827 A1* 4/2014 Jongren .............. H04L 25/0222
370/329
2014/0119266 A1* 5/2014 Ng ...................... H04L 27/2602
370/312
(Continued)

FOREIGN PATENT DOCUMENTS

WO  WO2016159673  10/2016

OTHER PUBLICATIONS

Nokia, Nokia Shanghai Bell, "On QCL Framework and Configurations in NR," R1-1714261, 3GPP TSG RAN WG1#90, Prague, Czech Republic, dated Aug. 21-25, 2017, 9 pages.
(Continued)

*Primary Examiner* — Jael M Ulysse
(74) *Attorney, Agent, or Firm* — Fish & Richardson P.C.

(57) ABSTRACT

The present specification provides a method for receiving data on the basis of quasi co-location (QCL) in a wireless communication system. More particularly, a data reception method performed by means of a terminal comprises the steps of: receiving transmission configuration indication (TCI) state information relating to at least one QCL indication with respect to a downlink reference signal (DL RS) from a base station by means of RRC signaling; receiving a
(Continued)

physical downlink control channel (PDCCH), comprising downlink control information (DCI), on a first slot from the base station; and receiving a physical downlink shared channel (PDSCH) comprising data from the base station on the basis of one or more QCL indications. Therefore, the flexibility of the terminal during beam switching can be enhanced.

8 Claims, 16 Drawing Sheets

Related U.S. Application Data filed on Nov. 16, 2017, provisional application No. 62/565,126, filed on Sep. 29, 2017.

(51) Int. Cl.
| | |
|---|---|
| *H04B 7/01* | (2006.01) |
| *H04L 5/00* | (2006.01) |
| *H04W 8/24* | (2009.01) |
| *H04W 72/04* | (2009.01) |

(52) U.S. Cl.
CPC ....... *H04W 72/042* (2013.01); *H04W 72/046* (2013.01); *H04W 72/0446* (2013.01); *H04W 76/27* (2018.02)

(56) References Cited

U.S. PATENT DOCUMENTS

| | | | | |
|---|---|---|---|---|
| 2014/0126490 A1* | 5/2014 | Chen | ..................... | H04L 1/0067 370/329 |
| 2014/0341143 A1* | 11/2014 | Yang | ....................... | H04L 5/001 370/329 |
| 2015/0215908 A1* | 7/2015 | Seo | ....................... | H04L 5/0048 370/329 |
| 2015/0223208 A1* | 8/2015 | Park | ........................ | H04W 4/06 370/329 |
| 2015/0249517 A1* | 9/2015 | Seo | ..................... | H04W 72/042 370/329 |
| 2015/0257130 A1* | 9/2015 | Lee | ....................... | H04L 5/1469 370/336 |
| 2015/0349940 A1* | 12/2015 | Kim | ...................... | H04L 5/0023 370/329 |
| 2016/0006547 A1* | 1/2016 | Kang | ................... | H04L 5/0094 370/329 |
| 2016/0013903 A1* | 1/2016 | Kim | ...................... | H04L 5/0048 370/329 |
| 2016/0219600 A1* | 7/2016 | Li | ........................ | H04L 5/0057 |
| 2018/0343653 A1* | 11/2018 | Guo | ................. | H04W 72/0446 |
| 2019/0069285 A1* | 2/2019 | Chandrasekhar | .... | H04B 7/0695 |
| 2020/0100301 A1* | 3/2020 | Kusashima | ........... | H04W 24/08 |

OTHER PUBLICATIONS

Nokia, Nokia Shanghai Bell, "Summary of offline QCL discussion," R1-1715293, 3GPP TSG RAN WG1 #90, Prague, Czech Republic, dated Aug. 21-25, 2017, 5 pages NTT DOCOMO, "General Views on QCL Design for NR," R1-1703926, Prague, Czech Republic, dated Aug. 21-25, 2017, 7 pages.

Samsung, "On QCL for NR," R1-1713609, 3GPP TSG RAN WG1#90, Prague, Czech Republic, dated Aug. 21-25, 2017, 9 pages.

* cited by examiner

FIG. 5
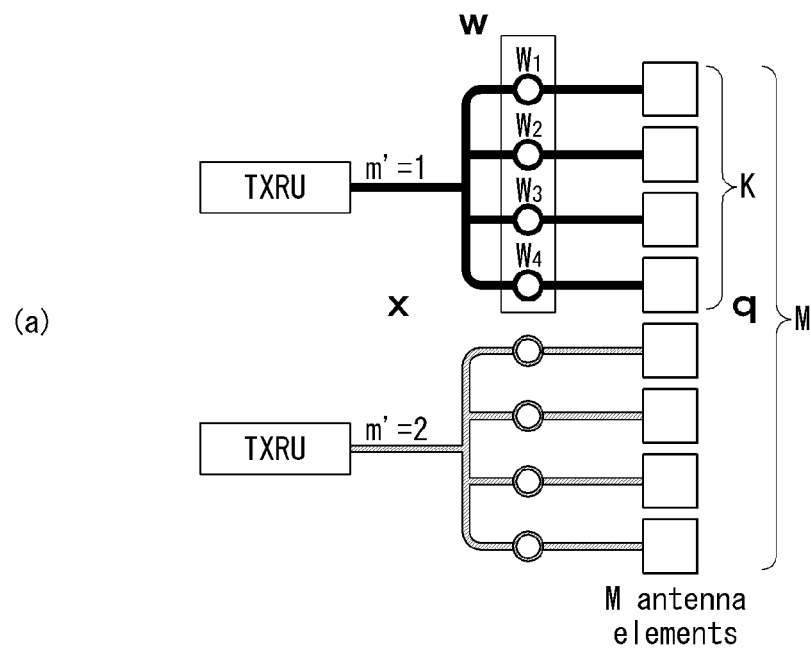
(a)
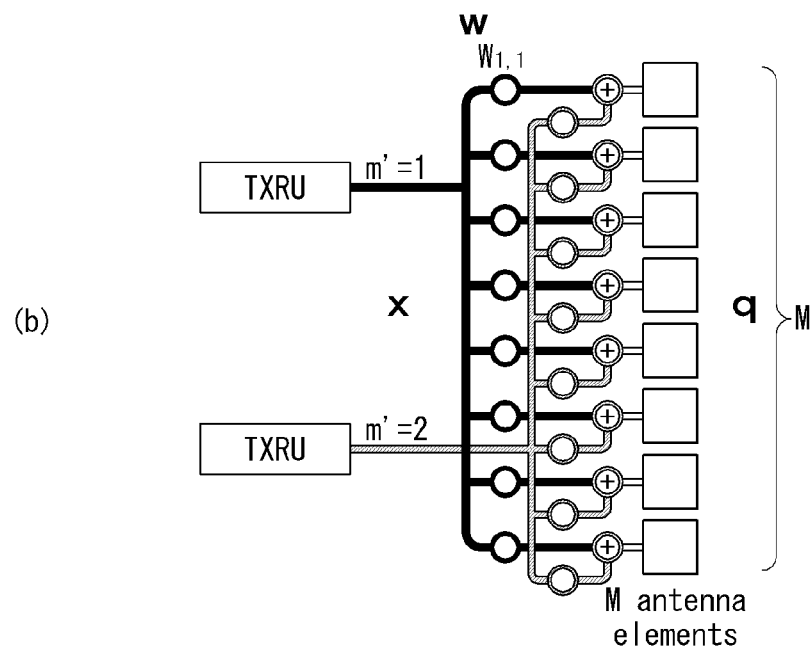
(b)

FIG. 8
(a) 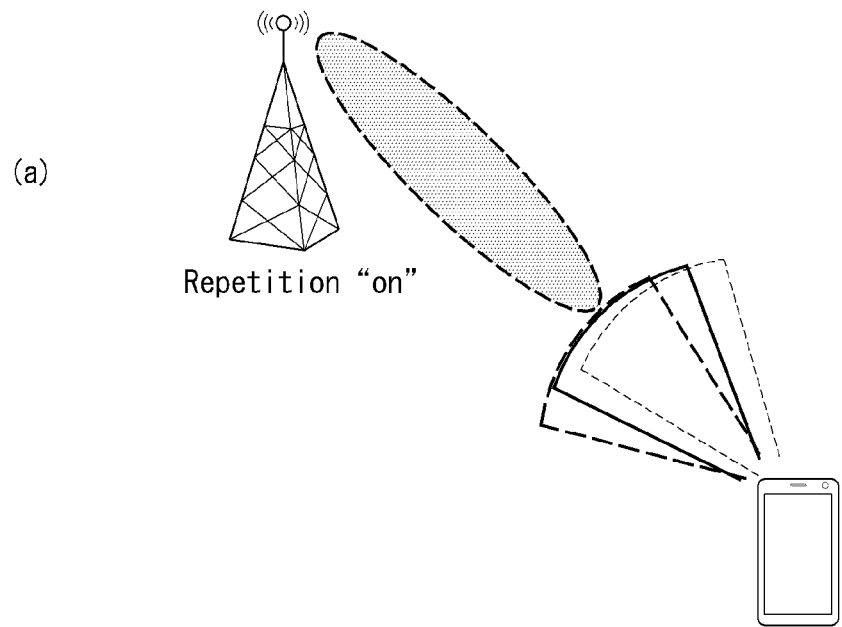
(b) 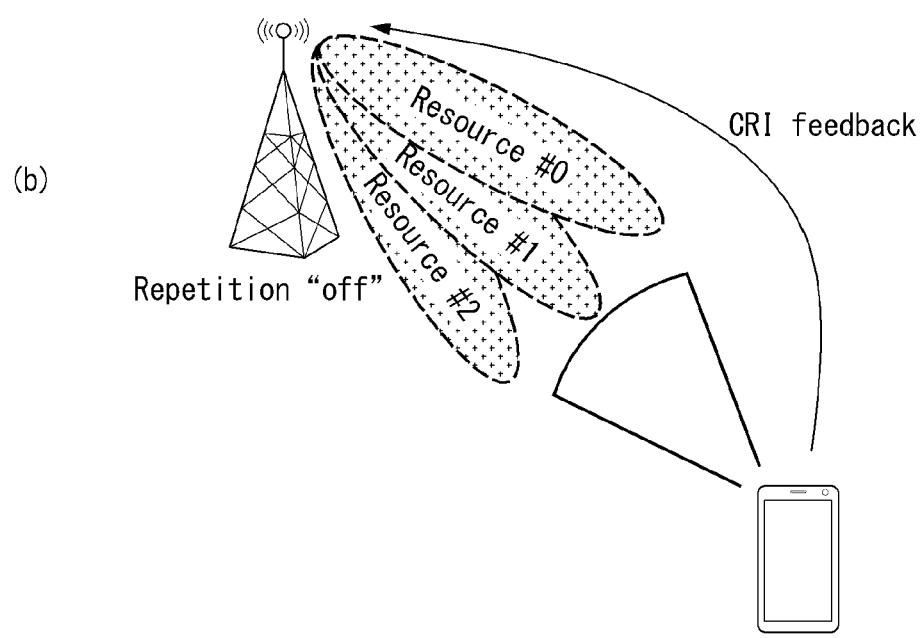

METHOD FOR TRANSMITTING AND RECEIVING DATA ON BASIS OF QCL IN WIRELESS COMMUNICATION SYSTEM, AND DEVICE THEREFOR

CROSS-REFERENCE TO RELATED APPLICATIONS

This application is a National Stage filing under 35 U.S.C. 371 of International Application No. PCT/KR2018/011642, filed on Oct. 1, 2018, which claims the benefit of U.S. Provisional Application No. 62/565,126, filed on Sep. 29, 2017, U.S. Provisional Application No. 62/587,435, filed on Nov. 16, 2017, and U.S. Provisional Application No. 62/621,553, filed on Jan. 24, 2018, the contents of which are all hereby incorporated by reference herein in their entirety.

TECHNICAL FIELD

The disclosure relates to a wireless communication system, and more specifically, to apparatus for transmitting/receiving data based on a quasi-co location (QCL) and supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DETAILED DESCRIPTION OF THE INVENTION

Technical Problem

The disclosure aims to provide a method of providing different QCL application times to QCL parameters.

Further, the disclosure aims to provide a method of defining (or setting) a delay in applying the QCL indication on the UL upon QCL indication related to cross-CC (or BWP).

Further, the disclosure aims to provide a method of addressing ambiguity between RRC signaling and MAC CE reception upon PDCCH beam indication.

Objects of the present disclosure are not limited to the foregoing, and other unmentioned objects would be apparent to one of ordinary skill in the art from the following description.

Technical Solution

According to the disclosure, a method of receiving data based on a quasi-co location (QCL) in a wireless communication system, performed by a user equipment (UE), comprises receiving transmission configuration indication (TCI) state information related to a QCL indication for at least one downlink reference signal (DL RS) from a base station via RRC signaling, receiving a physical downlink control channel (PDCCH) including downlink control information (DCI) from the base station in a first slot, and receiving, from the base station, a physical downlink shared channel (PDSCH) including the data based on one or more QCL indications, wherein among the QCL indications, a spatial QCL indication is a QCL indication included in the PDCCH received in the first slot or a latest slot prior to the first slot, and among the QCL indications, at least one QCL indication except for the spatial QCL indication is a QCL indication included in the PDCCH received in the first slot.

Further, in the disclosure, the latest slot prior to the first slot is a latest slot prior to (the first slot—X symbols).

Further, in the disclosure, at least one QCL indication except for the spatial QCL indication includes at least one of delay spread, average delay, doppler spread, or Doppler shift.

Further, in the disclosure, the X symbols are a timing gap related to changing of a Rx beam of the PDSCH and decoding of the PDCCH.

Further, in the disclosure, the method further comprises reporting capability information including the X value to the base station.

Further, in the disclosure, receiving the data via the PDSCH further includes changing a Rx beam for receiving the PDSCH based on the X value.

Further, in the disclosure, the X symbols are configured in a time domain where the PDSCH is received.

According to the disclosure, a method of transmitting data based on a quasi-co location (QCL) in a wireless communication system, performed by a base station, comprises transmitting transmission configuration indication (TCI) state information related to a QCL indication for at least one downlink reference signal (DL RS) to a user terminal (UE) via RRC signaling, transmitting a physical downlink control channel (PDCCH) including downlink control information (DCI) to the UE in a first slot, and transmitting, to the UE, a physical downlink shared channel (PDSCH) including the data based on one or more QCL indications, wherein among the QCL indications, a spatial QCL indication is a QCL indication included in the PDCCH transmitted in the first slot or a latest slot prior to the first slot, and among the QCL indications, at least one QCL indication except for the spatial QCL indication is a QCL indication included in the PDCCH transmitted in the first slot.

Further, in the disclosure, the method further comprises receiving, from the UE, the UE's capability information including information for a timing gap related to changing of a Rx beam of the PDSCH, determining the X value based on the received timing gap information, and transmitting information for the determined X value to the UE.

According to the disclosure, a UE for receiving data based on a quasi-co location (QCL) in a wireless communication system comprises a radio frequency (RF) module for transmitting/receiving a radio signal and a processor functionally connected with the RF module, wherein the processor is configured to receive transmission configuration indication (TCI) state information related to a QCL indication for at least one downlink reference signal (DL RS) from a base station via RRC signaling, receive a physical downlink control channel (PDCCH) including downlink control information (DCI) from the base station in a first slot, and receive, from the base station, a physical downlink shared channel (PDSCH) including the data based on one or more QCL indications, wherein among the QCL indications, a spatial QCL indication is a QCL indication included in the PDCCH received in the first slot or a latest slot prior to the first slot, and among the QCL indications, at least one QCL indication except for the spatial QCL indication is a QCL indication included in the PDCCH received in the first slot.

According to the disclosure, a base station for transmitting data based on a quasi-co location (QCL) in a wireless communication system comprises a radio frequency (RF) module for transmitting/receiving a radio signal; and a processor functionally connected with the RF module, wherein the processor is configured to transmit transmission configuration indication (TCI) state information related to a QCL indication for at least one downlink reference signal (DL RS) to a UE via RRC signaling, transmit a physical downlink control channel (PDCCH) including downlink control information (DCI) to the UE in a first slot, and transmit, to the UE, a physical downlink shared channel (PDSCH) including the data based on one or more QCL indications, wherein among the QCL indications, a spatial QCL indication is a QCL indication included in the PDCCH transmitted in the first slot or a latest slot prior to the first slot, and among the QCL indications, at least one QCL indication except for the spatial QCL indication is a QCL indication included in the PDCCH transmitted in the first slot.

Advantageous Effects

The disclosure may provide better flexibility in implementing the UE upon beam switching.

Effects of the present disclosure are not limited to the foregoing, and other unmentioned effects would be apparent to one of ordinary skill in the art from the following description.

BRIEF DESCRIPTION OF DRAWINGS

A more complete appreciation of the present disclosure and many of the attendant aspects thereof will be readily obtained as the same becomes better understood by reference to the following detailed description when considered in connection with the accompanying drawings, wherein:

FIG. 5 illustrates an example transceiver unit model in a wireless communication system to which the disclosure may apply.

FIG. 8 is a view illustrating an example DL BM procedure using a CSI-RS.

MODE TO PRACTICE THE DISCLOSURE

Figure 1:
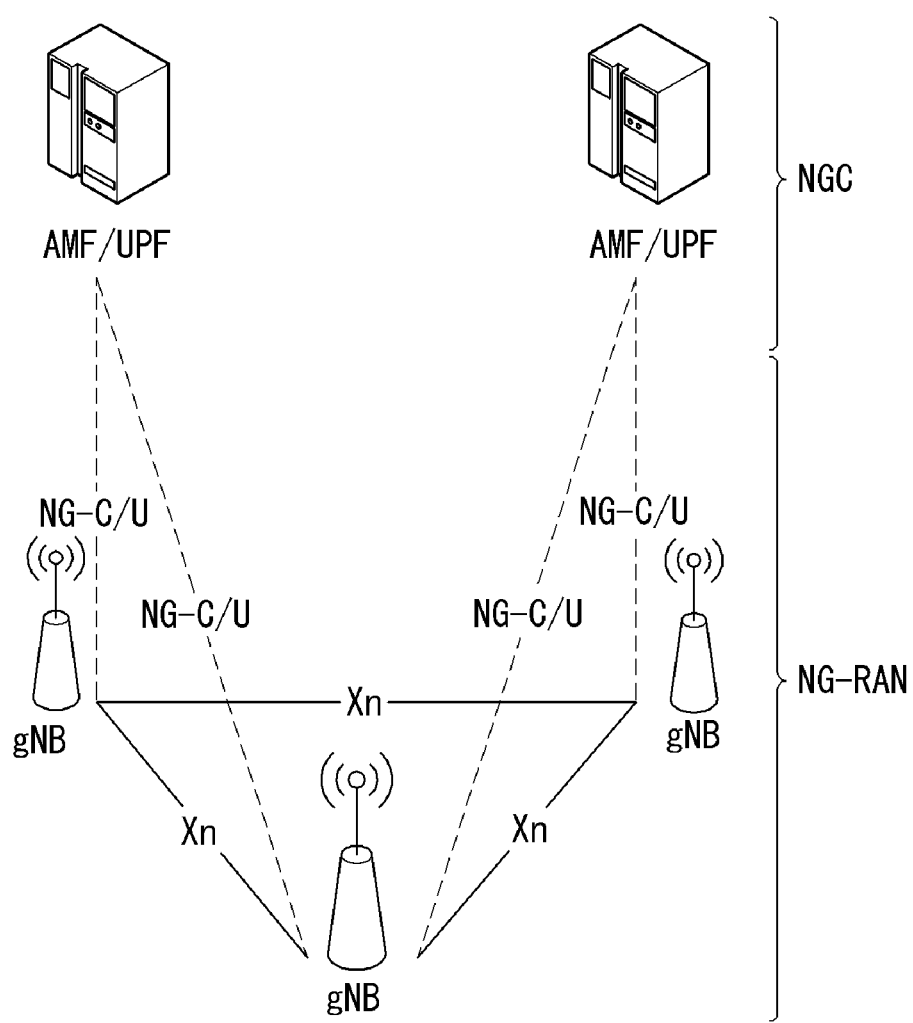
FIG. 1 is a view illustrating an example overall NR system structure to which a method as proposed in the disclosure may apply.

In what follows, preferred embodiments of the present disclosure will be described in detail with reference to appended drawings. Detailed descriptions to be disclosed below with reference to the appended drawings are intended to describe illustrative embodiments of the present disclosure but are not intended to represent the sole embodiment of the present disclosure. Detailed descriptions below include specific details to provide complete understanding of the present disclosure. However, it should be understood by those skilled in the art that the present disclosure may be embodied without the specific details to be introduced.

In some cases, to avoid obscuring the gist of the present disclosure, well-known structures and devices may be omitted or may be depicted in the form of a block diagram with respect to core functions of each structure and device.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) may be replaced with a term such as fixed station, Node B, evolved-NodeB (eNB), Base Transceiver System (BTS), Access Point (AP), or general NB (gNB). Also, a terminal can be fixed or mobile; and the term may be replaced with a term such as User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

Specific terms used in the following descriptions are introduced to help understanding the present disclosure, and the specific terms may be used in different ways as long as it does not leave the technical scope of the present disclosure.

The technology described below may be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA may be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA may be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

The 5G NR defines enhanced Mobile Broadband (eMBB), massive Machine Type Communication (mMTC), Ultra-Reliable and Low Latency Communications (URLLC), and vehicle-to-everything (V2X) depending on usage scenarios.

And the 5G NR standard is divided into standalone (SA) and non-standalone (NSA) modes according to co-existence between the NR system and the LTE system.

And the 5G NR supports various subcarrier spacing and supports CP-OFDM for downlink transmission while CP-OFDM and DFT-s-OFDM (SC-OFDM) for uplink transmission.

The embodiments of the present disclosure may be supported by standard documents disclosed for at least one of wireless access systems such as the IEEE 802, 3GPP, and 3GPP2. In other words, those steps or portions among embodiments of the present disclosure not described to clearly illustrate the technical principles of the present disclosure may be backed up by the aforementioned documents. Also, all of the terms disclosed in the present document may be described by the aforementioned standard documents.

For the purpose of clarity, descriptions are given mainly with respect to the 3GPP LTE/LTE-A, but the technical features of the present disclosure are not limited to the specific system.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User Plane Gateway: A Terminal Point of NG-U Interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 2:
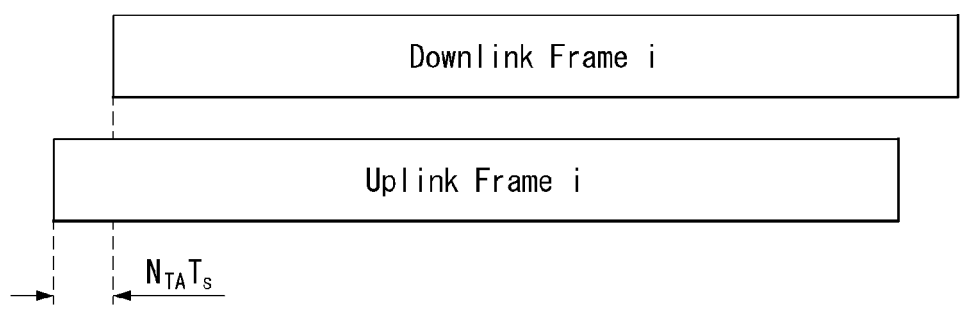
FIG. 2 illustrates the relationship between an uplink frame and downlink frame in a wireless communication system to which a method as proposed in the disclosure may apply.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology $\mu$, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology $\mu$, and Table 3 shows the number of OFDM symbols per slot for an extended CP in the numerology $\mu$.

relationship. Herein, the large-scale properties may include at least one of delay spread, Doppler spread, Doppler shift, average gain, and average delay.

Figure 3:
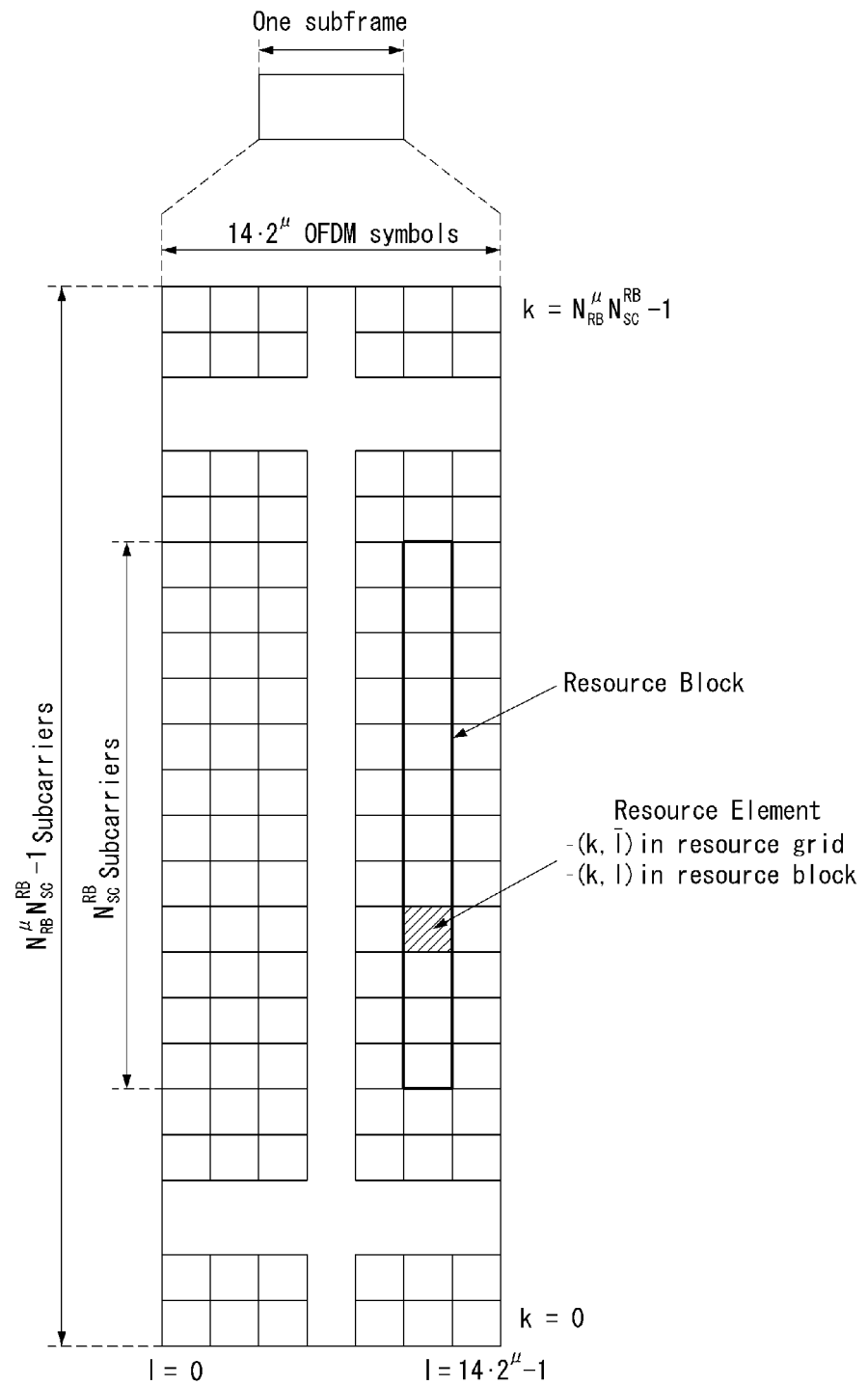
FIG. 3 illustrates an example resource grid supported in a wireless communication system to which a method as proposed in the disclosure may apply.

FIG. 3 illustrates an example of a resource grid supported in a wireless communication system to which a method proposed by the present disclosure may be implemented.

Referring to FIG. 3, a resource grid is composed of $N_{RB}^\mu N_{sc}^{RB}$ subcarriers in a frequency domain, each subframe composed of $14 \cdot 2\mu$ OFDM symbols, but the present disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols Herein, $N_{RB}^\mu \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 3, one resource grid may be configured for the numerology $\mu$ and an antenna port p.

Each element of the resource grid for the numerology $\mu$ and the antenna port p is indicated as a resource element, and may be uniquely identified by an index pair (k,l̄). Herein, $k=0, \ldots, N_{RB}^\mu N_{sc}^{RB}-1$ is an index in the frequency domain, and $\bar{l}=0, \ldots, 2^\mu N_{symb}^{(\mu)}-1$ indicates a location of a symbol

TABLE 2

Slot configuration

| | 0 | | | 1 | | |
|---|---|---|---|---|---|---|
| $\mu$ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

Slot configuration

| | 0 | | | 1 | | |
|---|---|---|---|---|---|---|
| $\mu$ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location)

in a subframe. To indicate a resource element in a slot, the index pair (k,l̄) is used. Herein, $l=0, \ldots, N_{symb}^\mu-1$.

The resource element (k,l̄) for the numerology $\mu$ and the antenna port p corresponds to a complex value $a_{k,\bar{l}}^{(p,\mu)}$. When there is no risk of confusion or when a specific antenna port or numerology is specified, the indexes p and $\mu$ may be dropped and thereby the complex value may become $a_{k,\bar{l}}^{(p)}$ or $a_{k,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^\mu-1$. At this point, a relationship between the physical resource block number $n_{PRB}$ and the resource elements (k,l̄) may be given as in Equation 1.

$$n_{PRB} = \left\lfloor \frac{k}{N_{sc}^{RB}} \right\rfloor \quad \text{Equation 1}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Self-Contained Subframe Structure

Figure 4:
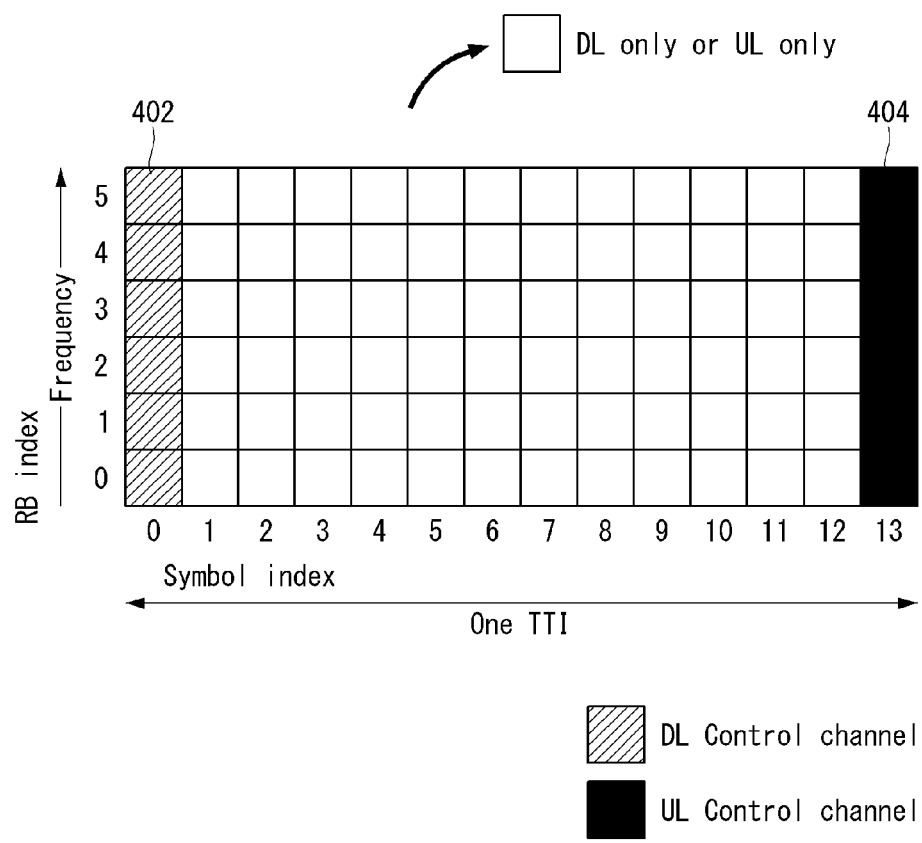
FIG. 4 illustrates an example self-contained subframe to which a method as proposed in the disclosure may apply.

FIG. 4 is a diagram illustrating an example of a self-contained subframe structure in a wireless communication system to which the present disclosure may be implemented.

In order to minimize data transmission latency in a TDD system, 5G new RAT considers a self-contained subframe structure as shown in FIG. 4.

In FIG. 4, a diagonal line area (symbol index 0) represents a UL control area, and a black area (symbol index 13) represents a UL control area. A non 0 shade area may be used for DL data transmission or for UL data transmission. This structure is characterized in that DL transmission and UL transmission are performed sequentially in one subframe and therefore transmission of DL data and reception of UL ACK/NACK may be performed in the subframe. In conclusion, it is possible to reduce time for retransmitting data upon occurrence of a data transmission error and thereby minimize a latency of final data transmission.

In this self-contained subframe structure, a time gap is necessary for a base station or a UE to switch from a transmission mode to a reception mode or to switch from the reception mode to the transmission mode. To this end, some OFDM symbols at a point in time of switching from DL to UL in the self-contained subframe structure are configured as a guard period (GP).

Analog Beamforming

Since a wavelength is short in a Millimeter Wave (mmW) range, a plurality of antenna elements may be installed in the same size of area. That is, a wavelength in the frequency band 30 GHz is 1 cm, and thus, 64 (8×8) antenna elements may be installed in two-dimensional arrangement with a 0.5 lambda (that is, a wavelength) in 4×4 (4 by 4) cm panel. Therefore, in the mmW range, the coverage may be enhanced or a throughput may be increased by increasing a beamforming (BF) gain with a plurality of antenna elements.

In this case, in order to enable adjusting transmission power and phase for each antenna element, if a transceiver unit (TXRU) is included, independent beamforming for each frequency resource is possible. However, it is not cost-efficient to install TXRU at each of about 100 antenna elements. Thus, a method is considered in which a plurality of antenna elements is mapped to one TXRU and a direction of beam is adjusted with an analog phase shifter. Such an analog BF method is able to make only one beam direction over the entire frequency band, and there is a disadvantage that frequency-selective BF is not allowed.

A hybrid BF may be considered which is an intermediate between digital BF and analog BF, and which has B number of TXRU less than Q number of antenna elements. In this case, although varying depending upon a method of connecting B number of TXRU and Q number of antenna elements, beam directions capable of being transmitted at the same time is restricted to be less than B.

Hereinafter, typical examples of a method of connecting TXRU and antenna elements will be described with reference to drawings.

FIG. 5 is an example of a transceiver unit model in a wireless communication system to which the present disclosure may be implemented.

A TXRU virtualization model represents a relationship between output signals from TXRUs and output signals from antenna elements. Depending on a relationship between antenna elements and TXRUs, the TXRU virtualization model may be classified as a TXRU virtualization model option-1: sub-array partition model, as shown in FIG. 5(a), or as a TXRU virtualization model option-2: full-connection model.

Referring to FIG. 5(a), in the sub-array partition model, the antenna elements are divided into multiple antenna element groups, and each TXRU may be connected to one of the multiple antenna element groups. In this case, the antenna elements are connected to only one TXRU.

Referring to FIG. 5(b), in the full-connection model, signals from multiple TXRUs are combined and transmitted to a single antenna element (or arrangement of antenna elements). That is, this shows a method in which a TXRU is connected to all antenna elements. In this case, the antenna elements are connected to all the TXRUs.

In FIG. 5, q represents a transmitted signal vector of antenna elements having M number of co-polarized in one column. W represents a wideband TXRU virtualization weight vector, and W represents a phase vector to be multiplied by an analog phase shifter. That is, a direction of analog beamforming is decided by W. x represents a signal vector of M_TXRU number of TXRUs.

Herein, mapping of the antenna ports and TXRUs may be performed on the basis of 1-to-1 or 1-to-many.

TXRU-to-element mapping In FIG. 5 is merely an example, and the present disclosure is not limited thereto and may be equivalently applied even to mapping of TXRUs and antenna elements which can be implemented in a variety of hardware forms.

Channel State Information (CSI) Feedback

In most cellular systems including an LTE system, a UE receives a pilot signal (or a reference signal) for estimating a channel from a base station, calculate channel state information (CSI), and reports the CSI to the base station.

The base station transmits a data signal based on the CSI information fed back from the UE.

The CSI information fed back from the UE in the LTE system includes channel quality information (CQI), a precoding matrix index (PMI), and a rank indicator (RI).

CQI feedback is wireless channel quality information which is provided to the base station for a purpose (link adaptation purpose) of providing a guidance as to which modulation & coding scheme (MCS) to be applied when the base station transmits data.

In the case where there is a high wireless quality of communication between the base station and the UE, the UE may feed back a high CQI value and the base station may transmit data by applying a relatively high modulation order and a low channel coding rate. In the opposite case, the UE may feed back a low CQI value and the base station may transmit data by applying a relatively low modulation order and a high channel coding rate.

PMI feedback is preferred precoding matrix information which is provided to a base station in order to provide a guidance as to which MIMO precoding scheme is to be applied when the base station has installed multiple antennas.

A UE estimates a downlink MIMO channel between the base station and the UE from a pilot signal, and recommends, through PMI feedback, which MIMO precoding is desired to be applied by the base station.

In the LTE system, only linear MIMO precoding capable of expressing PMI configuration in a matrix form is considered.

The base station and the UE share a codebook composed of a plurality of precoding matrixes, and each MIMO precoding matrix in the codebook has a unique index.

Accordingly, by feeding back an index corresponding to the most preferred MIMO precoding matrix in the codebook as PMI, the UE minimizes an amount of feedback information thereof.

A PMI value is not necessarily composed of one index. For example, in the case where there are eight transmitter antenna ports in the LTE system, a final 8tx MIMO precoding matrix may be derived only when two indexes (first PMI & second PMI) are combined.

RI feedback is information on the number of preferred transmission layers, the information which is provided to the base station in order to provide a guidance as to the number of the UE's preferred transmission layers when the base station and the UE have installed multiple antennas to thereby enable multi-layer transmission through spatial multiplexing.

Hereinafter, methods as proposed in the disclosure are described.

First described is a method for performing demodulation with a UE-specific reference signal (RS), such as a specific DMRS, when a UE receives data (e.g., PDSCH).

The UE-specific DMRS is transmitted together only in the scheduled resource block(s) (RBs) of the corresponding PDSCH and is transmitted only during the time period when the scheduled PDSCH is transmitted.

Thus, the reception performance may be limited when the UE performs channel estimation only with the corresponding DMRS itself.

For example, to perform channel estimation, estimated values of major large-scale parameters/properties (LSP) of radio channel are required.

The DMRS density may be too insufficient to obtain the same only with the DMRS present in the time/frequency domain where the scheduled PDSCH is transmitted.

Thus, to support implementation of such a UE, the LTE-A and NR standards define quasi co-location (QCL) signaling between RS ports, assumption, and behavior and support methods able to thereby configure (operate) the UE.

As used herein, the term "define" may be interchangeably used with "configure," "indicate," or "determine."

As used herein, the term "expect" may be interchangeably used with "assume" or "predict."

As used herein, the phrase "A and/or B" may have the same meaning as "including at least one of A or B."

Hereinafter, QCL-related content and beam management (BM) are described below in greater detail.

Beam Management (BM) Procedure

The beam management (BM) procedure defined in new radio (NR) is described.

The BM procedure, as layer 1 (L1)/layer 2 (L2) procedures for obtaining and maintaining a set of base station (e.g., gNB or TRP) and/or terminal (e.g., UE) beams available for downlink (DL) and uplink (UL) transmission/reception, may include the following procedures and terminology.

Beam measurement: the operation that the base station or UE measures the characteristics of a received beam formation signal.

Beam determination: the operation that the base station or UE selects its Tx beam (Tx beam)/Rx beam (Rx beam).

Beam sweeping: the operation that covers the space region using the transmission and/or Rx beam during a predetermined time interval in a predetermined manner.

Beam reporting: the operation that the UE reports information for a signal beamformed based on beam measurement.

The BM procedure may be divided into (1) the DL BM procedure that uses the synchronization signal (SS)/physical broadcast channel (PBCH) block or CSI-RS and (2) the UL BM procedure that uses the sounding reference signal (SRS).

Further, each BM procedure may include Tx beam sweeping for determining the Tx beam and RX beam sweeping for determining the Rx beam.

DL BM Procedure

First, the DL BM procedure is described.

The DL BM procedure may include (1) the base station's transmission for beamformed DL reference signals (RSs) (e.g., CSI-RS or SS block (SSB)) and (2) the UE's beam reporting.

Here, beam reporting may include preferred DL RS identifier (ID)(s) and its corresponding L1-RSRP (Reference Signal Received Power).

The DL RS ID may be the SSB resource indicator (SSBRI) or CSI-RS resource indicator (CRI).

Figure 6:
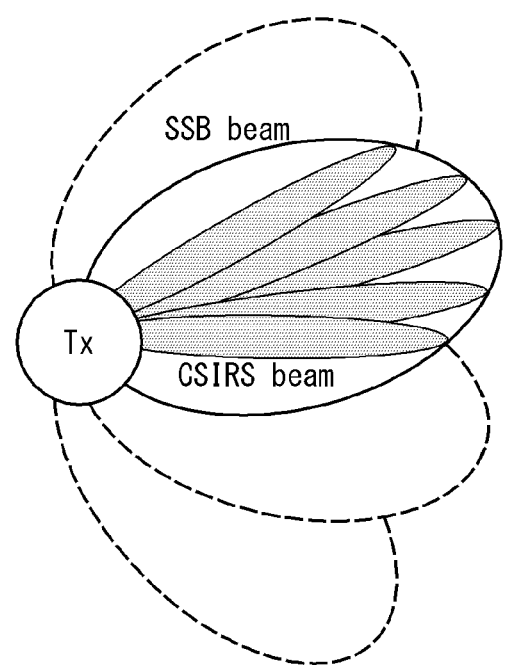
FIG. 6 is a view illustrating an example Tx beam related to a DL BM procedure.

FIG. 6 is a view illustrating an example Tx beam related to a DL BM procedure.

As shown in FIG. 6, the SSB beam and the CSI-RS beam may be used for beam measurement.

Here, the measurement metric is per-resource/block L1-RSRP.

The SSB may be used for coarse beam measurement, and the CSI-RS may be used for fine beam measurement.

The SSB may be used for both Tx beam sweeping and Rx beam sweeping.

Rx beam sweeping using the SSB may be performed while the UE changes Rx beams for the same SSBRI across multiple SSB bursts.

Here, one SS burst includes one or more SSBs, and one SS burst set includes one or more SSB bursts.

DL BM Procedure Using SSB

Figure 7:
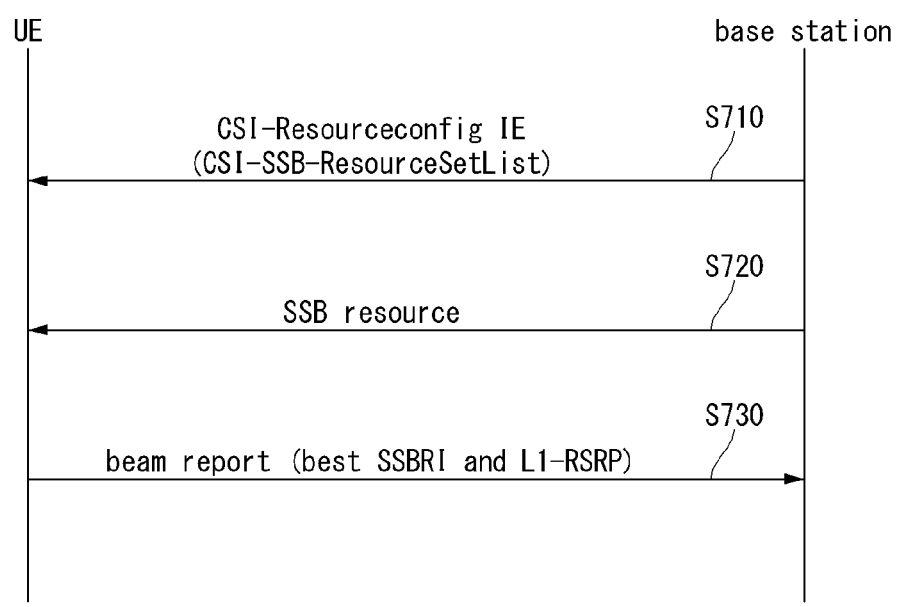
FIG. 7 is a flowchart illustrating an example DL BM procedure using an SSB.

FIG. 7 is a flowchart illustrating an example DL BM procedure using an SSB.

The configuration for beam reporting using the SSB is performed upon CSI/beam configuration in the connected state (or RRC connected mode).

As in the CSI-ResourceConfig IE of Table 4, the BM configuration using the SSB is not separately defined, but the SSB is configured like the CSI-RS resource.

Table 4 shows an example of the CSI-ResourceConfig IE.

TABLE 4

```
ASN1START
TAG-CSI-RESOURCECONFIG-START
CSI-ResourceConfig ::=        SEQUENCE {
csi-ResourceConfigId          CSI-ResourceConfigId,
```

TABLE 4-continued

```
csi-RS-ResourceSetList        CHOICE {
nzp-CSI-RS-SSB                SEQUENCE {
nzp-CSI-RS-ResourceSetList    SEQUENCE (SIZE (1..maxNrofNZP-CSI-RS-
ResourceSetsPerConfig)) OF NZP-CSI-RS-ResourceSetId OPTIONAL,
csi-SSB-ResourceSetList       SEQUENCE (SIZE (1..maxNrofCSI-SSB-
ResourceSetsPerConfig)) OF CSI-SSB-ResourceSetId OPTIONAL
},
csi-IM-ResourceSetList        SEQUENCE (SIZE (1..maxNrofCSI-IM-
ResourceSetsPerConfig)) OF CSI-IM-ResourceSetId
},
bwp-Id                        BWP-Id,
resourceType                  ENUMERATED { aperiodic, semiPersistent, periodic },
...
}
TAG-CSI-RESOURCECONFIGTOADDMOD-STOP
ASN1STOP
```

In Table 4, csi-SSB-ResourceSetList parameter refers to a list of SSB resources used for beam management and reporting in one resource set.

The UE receives, from the base station, the CSI-ResourceConfig IE including the CSI-SSB-ResourceSetList including SSB resources (S710).

Here, the SSB resource set may be configured as {SSBx1, SSBx2, SSBx3, SSBx4, . . . }.

The SSB index may be defined from 0 to 63.

The UE receives the SSB resource from the base station based on the CSI-SSB-ResourceSetList (S720).

Where the CSI-RS reportConfig related to reporting for SSBRI and L1-RSRP is configured, the UE (beam) reports the best SSBRI and its corresponding L1-RSRP to the base station (S730).

That is, if the reportQuantity of the CSI-RS reportConfig IE is set to 'ssb-Index-RSRP,' the UE reports the best SSBRI and its corresponding L1-RSRP to the base station.

Where the CSI-RS resource is configured in the same OFDM symbol(s) as the SSB (SS/PBCH Block), and 'QCL-TypeD' is applicable, the UE may assume that the CSI-RS and the SSB are quasi co-located in terms of 'QCL-TypeD.'

Here, the QCL TypeD may mean that the antenna ports are QCLed in terms of spatial Rx parameter. The same Rx beam may be applied when the UE receives a plurality of DL antenna ports that have the QCL Type D relationship.

Further, the UE does not expect a CSI-RS to be configured in the RE overlapping the RE of the SSB.

DL BM Procedure Using CSI-RS

Where the NZP-CSI-RS-ResourceSet is configured for the UE, with the (higher layer parameter) repetition 'ON,' the UE may assume that at least one CSI-RS resource in the NZP-CSI-RS-ResourceSet is transmitted to the same downlink spatial domain transmission filter.

That is, at least one CSI-RS resource in the NZP-CSI-RS-ResourceSet is transmitted via the same Tx beam.

Here, at least one CSI-RS resource in the NZP-CSI-RS-ResourceSet may be transmitted via different OFDM symbols or in different frequency domains (i.e., FDM).

Where the at least one CSI-RS resource is FDMed, this is the case where the UE is the multi-panel UE.

The case where the repetition is set to 'ON' is related to the UE's Rx beam sweeping procedure.

The UE does not expect to receive different periodicities in the periodicityAndOffset in all the CSI-RS resources in the NZP-CSI-RS-Resourceset.

If the repetition is set to 'OFF,' the UE does not assume that at least one CSI-RS resource in the NZP-CSI-RS-ResourceSet is transmitted to the same downlink spatial domain transmission filter.

That is, at least one CSI-RS resource in the NZP-CSI-RS-ResourceSet is transmitted via different Tx beams.

The case where the repetition is set to 'OFF' is related to the base station's Tx beam sweeping procedure.

The repetition parameter may be configured only for the CSI-RS resource sets associated with the CSI-ReportConfig that has a report of 'No Report (or None)' or L1 RSRP.

If the CSI-ReportConfig with the reportQuantity set as 'cri-RSRP' or 'none' is configured for the UE, and CSI-ResourceConfig (higher layer parameter resourcesForChannelMeasurement) for channel measurement does not include the higher layer parameter 'trs-Info' but includes the NZP-CSI-RS-ResourceSet set with the higher layer parameter 'repetition' (repetition=ON), the UE may be configured only with the ports (1-port or 2-port) of the same number, which have the higher layer parameter 'nrofPorts' for all the CSI-RS resources in the NZP-CSI-RS-ResourceSet.

The uses of CSI-RS are described in greater detail. If the repetition parameter is configured, but the TRS_info is not configured, for a specific CSI-RS resource set, the CSI-RS is used for beam management.

Where the repetition parameter is not configured but the TRS_info is configured, the CSI-RS is used for tracking reference signal (TRS).

Where neither the repetition parameter nor the TRS_info is configured, the CSI-RS is used for CSI acquisition.

FIG. 8 is a view illustrating an example DL BM procedure using a CSI-RS.

FIG. 8a illustrates the UE's Rx beam determination (or refinement) procedure, and FIG. 10b illustrates the base station's Tx beam determination procedure.

FIG. 8a regards the case where the repetition parameter is set to 'ON,' and FIG. 8b regards the case where the repetition parameter is set to 'OFF.'

The UE's Rx beam determination process is described with reference to FIGS. 8a and 9.

Figure 9:
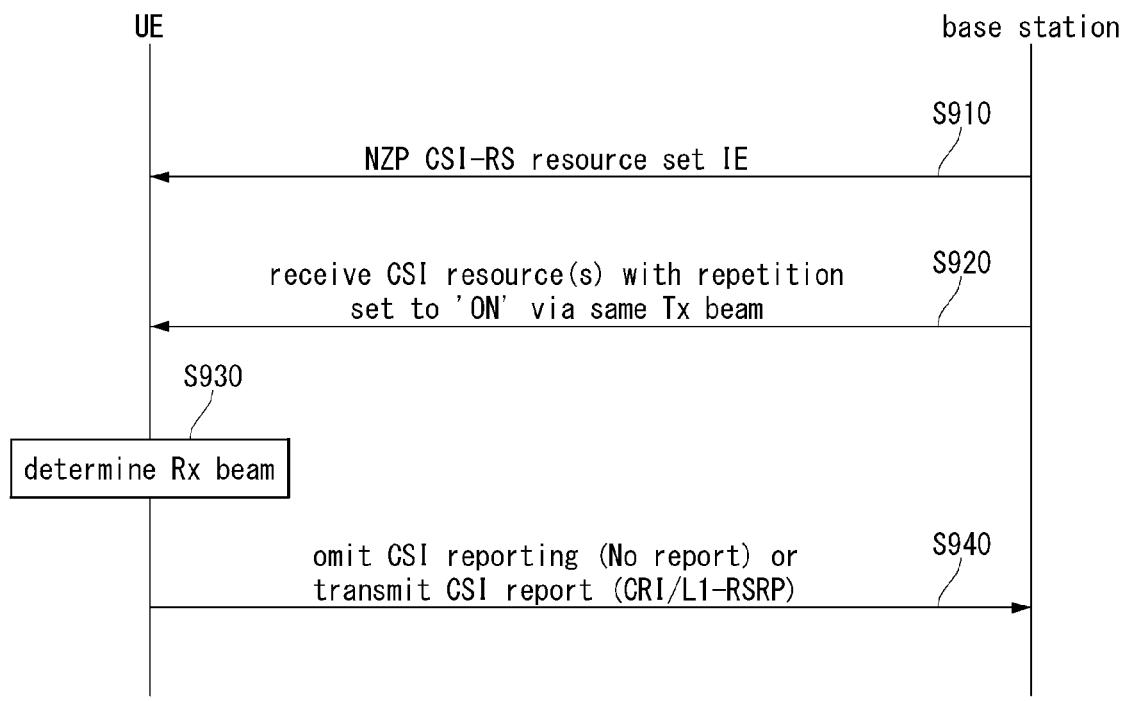
FIG. 9 is a flowchart illustrating an example process of determining a Rx beam by a UE.

FIG. 9 is a flowchart illustrating an example process of determining a Rx beam by a UE.

The UE receives the NZP CSI-RS resource set IE including the higher layer parameter repetition from the base station via RRC signaling (S910).

Here, the repetition parameter is set to 'ON.'

The UE repeatedly receives the resource(s) in the CSI-RS resource set with the repetition set to 'ON,' in different OFDM symbols via the same Tx beam (or DL spatial domain transmission filter) of the base station (S920).

By so doing, the UE determines its Rx beam (S930).

Here, the UE omits CSI reporting or transmits a CSI report including the CRI/L1-RSRP to the base station (S940).

In this case, the reportQuantity of CSI report config may be set to 'No report (or None)' or 'CSI and L1-RSRP.'

That is, if the repetition is set to 'ON,' the UE may omit CSI reporting or report ID information (CRI) for the preferred beam related to beam pair and a quality value (L1-RSRP) therefor.

The base station's Tx beam determination process is described with reference to FIGS. 8b and 10.

Figure 10:
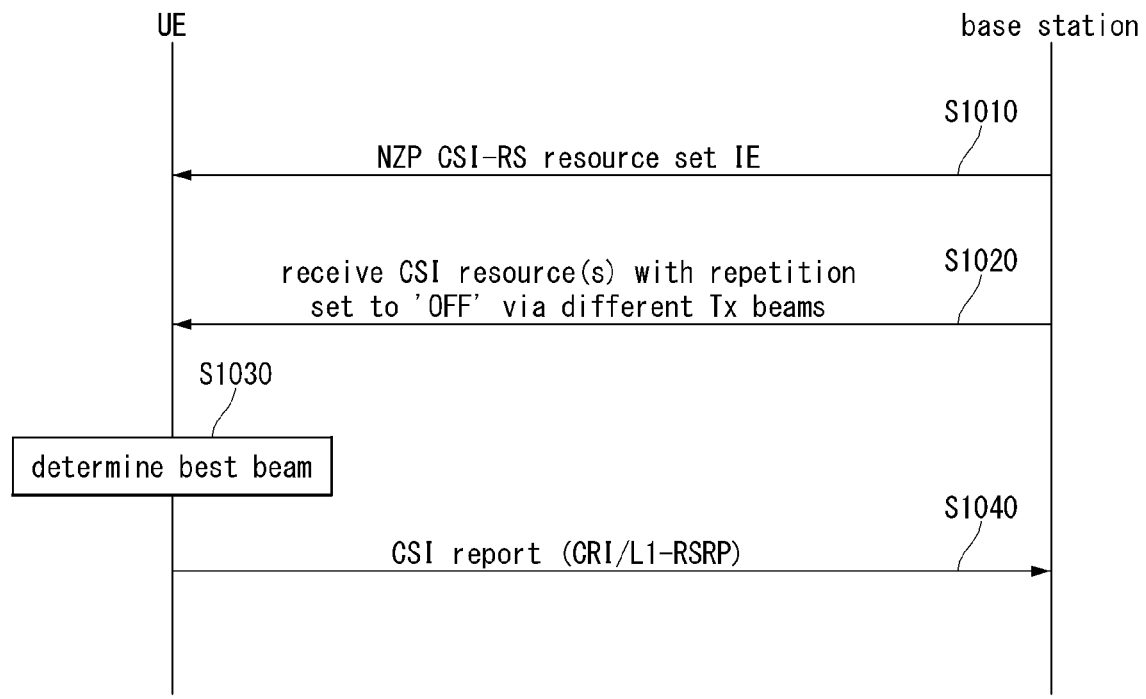
FIG. 10 is a flowchart illustrating an example process of determining a Tx beam by a base station.

FIG. 10 is a flowchart illustrating an example process of determining a Tx beam by a base station.

The UE receives the NZP CSI-RS resource set IE including the higher layer parameter repetition from the base station via RRC signaling (S1010).

Here, the repetition parameter is set to 'OFF' and is related to the base station's Tx beam sweeping procedure.

The UE receives the resources in the CSI-RS resource set with the repetition set to 'OFF' via the different Tx bemas (DL spatial domain transmission filter) of the base station (S1020).

The UE selects (or determines) the best beam (S1030) and reports the ID and relevant quality information (e.g., L1-RSRP) for the selected beam to the base station (S1040).

In this case, the reportQuantity of the CSI report config may be set to 'CRI+L1-RSRP.'

That is, if the CSI-RS is transmitted via the BM, the UE reports the CRI and L1-RSRP therefor to the base station.

Figure 11:
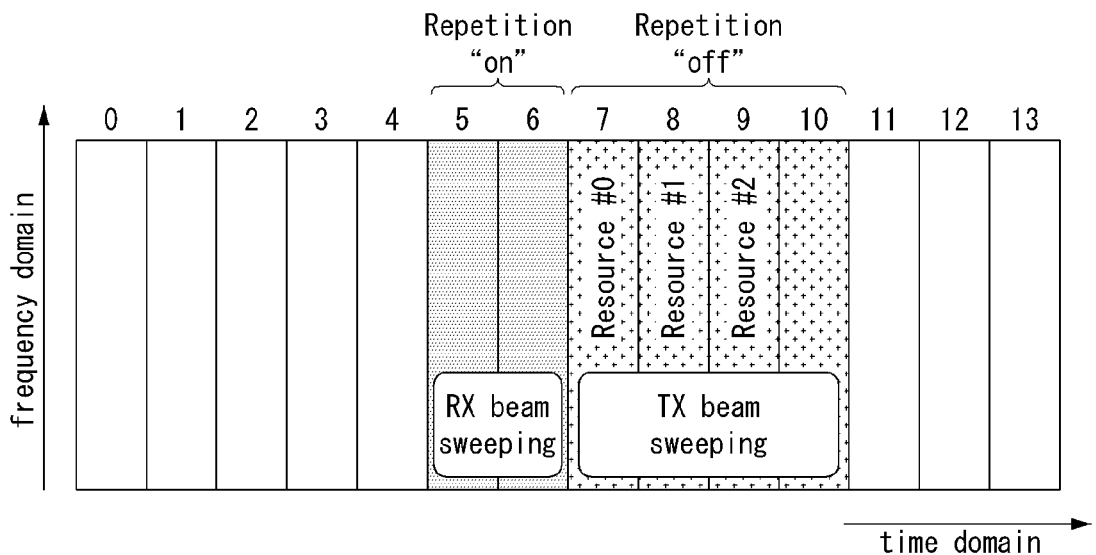
FIG. 11 is a view illustrating an example of allocating a resource in a time and frequency domain related to the operation of FIG. 8.

FIG. 11 is a view illustrating an example of allocating a resource in a time and frequency domain related to the operation of FIG. 8.

That is, where the repetition is set to 'ON' in the CSI-RS resource set, the same Tx beam may be repeatedly applied and used for a plurality of CSI-RS resources and, if the repetition is set to 'OFF' in the CSI-RS resource set, different CSI-RS resources may be transmitted via different Tx beams.

DL BM-Related Beam Indication

The UE may get a list of up to M candidate transmission configuration indication (TCI) states RRC-configured, at least, for the purpose of quasi co-location (QCL) indication. Here, M may be 64.

Each TCI state may be set to one RS set.

Each DL RS ID for the spatial QCL purpose (QCL Type D) purpose, at least, in the RS set may reference one of DL RS types, such as the SSB, P-CSI RS, SP-CSI RS, or A-CSI RS.

Initialization/update of the ID of the DL RS(s) in the RS set used, at least, for the spatial QCL purpose may be performed, at least, by explicit signaling.

Table 5 shows an example of TCI-State IE.

The TCI-State IE associates one or two DL reference signals (RSs) with their corresponding quasi co-location (QCL) types.

TABLE 5

```
ASN1START
TAG-TCI-STATE-START
TCI-State ::=         SEQUENCE {
tci-StateId           TCI-StateId,
qcl-Type1             QCL-Info,
qcl-Type2             QCL-
Info                             OPTIONAL,  -- Need R
...
}
QCL-Info ::=          SEQUENCE {
cell                  ServCellIndex
        OPTIONAL,     -- Need R
bwp-Id                BWP-
Id                               OPTIONAL, -- Cond
```

TABLE 5-continued

```
CSI-RS-Indicated
referenceSignal       CHOICE {
csi-rs                NZP-CSI-RS-ResourceId,
ssb                   SSB-Index
},
qcl-Type              ENUMERATED {typeA, typeB, typeC, typeD},
...
}
TAG-TCI-STATE-STOP
-- ASN1STOP
```

In Table 5, bwp-Id parameter refers to the DL BWP where the RS is positioned, cell parameter refers to the carrier where the RS is positioned, and reference signal parameter refers to the reference antenna port(s) which is the source of the quasi co-location for the corresponding target antenna port(s) or the reference signal including the same. The target antenna port(s) may be CSI-RS, PDCCH DMRS, or PDSCH DMRS. As an example, to indicate the QCL reference RS for NZP CSI-RS, the corresponding TCI state ID may be indicated in the NZP CSI-RS resource configuration information. As another example, to indicate the QCL reference information for PDCCH DMRS antenna port(s), the TCI state ID may be indicated in each CORESET configuration. As still another example, to indicate the QCL reference information for PDSCH DMRS antenna port(s), the TCI state ID may be indicated via the DCI.

QCL (Quasi-Co Location)

The antenna port is defined so that the channel carrying a symbol on the antenna port may be inferred from the channel carrying another symbol on the same antenna port. Where the property of the channel carrying a symbol on one antenna port may be inferred from the channel carrying a symbol on a different antenna port, the two antenna ports may be said to have a QC/QCL (quasi co-located or quasi co-location) relationship.

Here, the channel properties include one or more of delay spread, Doppler spread, frequency shift, average received power, received timing, and spatial RX parameter. Here, the Spatial Rx parameter means a spatial (reception) channel property parameter such as angle of arrival.

To decode the PDSCH according to a detected PDCCH with the DCI intended for the UE and given serving cell, the UE may be configured with a list of up to M TCI-state configurations in the higher layer parameter PDSCH-Config. M relies on UE capability.

Each TCI-State includes a parameter for configuring a quasi co-location relationship between one or more DL reference signals and the DM-RS port of PDSCH.

The Quasi co-location relationship is configured as the higher layer parameter qcl-Type1 for the first DL RS and the qcl-Type2 (when configured) for the second DL RS.

In the case of two DL RSs, the QCL type differs regardless of whether the DL RSs have the same or different references.

The quasi co-location type corresponding to each DL RS is given by the higher layer parameter qcl-Type of the QCL-Info and may have one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if the target antenna port is a specific NZP CSI-RS, the corresponding NZP CSI-RS antenna ports may be indicated/configured to have been QCLed with a specific TRS, in terms of QCL-Type A, and a specific SSB, in terms of QCL-Type D. The UE which has been indicated/configured so may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE receives an activation command used to map up to eight TCI states to the codepoint of the DCI field 'Transmission Configuration Indication.'

UL BM Procedure

The UL BM may get the Tx beam-Rx beam reciprocity (or beam correspondence) established or not established depending on the UE's implementation.

If no Tx beam-Rx beam reciprocity is established in both the base station and UE, a UL beam pair may be made via a DL beam pair.

However, if no Tx beam-Rx beam reciprocity is established in any one of the base station and UE, a process for determining a UL beam pair is needed separately from determining a DL beam pair.

Even when the base station and the UE both maintain the beam correspondence, the base station may use a UL BM procedure for determining the DL Tx beam although the UE does not report a (preferred) beam.

The UM BM may be performed via beamformed UL SRS transmission, and 'SRS-SetUse' parameter is set to 'Beam-Management.'

Likewise, the UL BM procedure may also be divided into the UE's Tx beam sweeping and the base station's Rx beam sweeping.

The UE may get one or more Sounding Reference Symbol (SRS) resource sets, which are configured by (higher layer parameter) SRS-ResourceSet, configured (via higher layer signaling, RRC signaling).

For each SRS resource set, the UE may get K≤1 SRS resources (higher later parameter SRS-resources) configured.

Here, K is a natural number, and the maximum K value is indicated by SRS_capability.

Whether the SRS resource set's UL BM applies is configured by the (higher layer parameter) SRS-SetUse.

If the SRS-SetUse is set to 'BeamManagement (BM),' only one SRS resource may be transmitted in each of the plurality of SRS resource sets at a given time instant.

Figure 12:
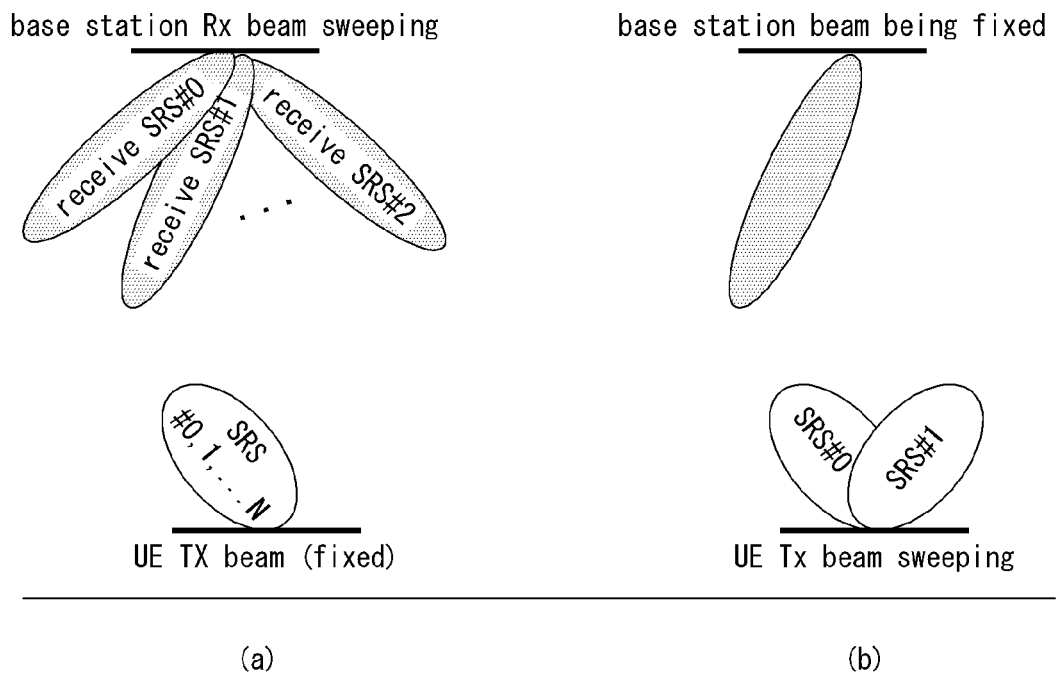
FIG. 12 is a view illustrating an example UL BM procedure using an SRS.

FIG. 12 is a view illustrating an example UL BM procedure using an SRS.

Specifically, FIG. 12a illustrates the base station's Rx beam determination procedure, and FIG. 12b illustrates the UE's Tx beam determination procedure.

Figure 13:
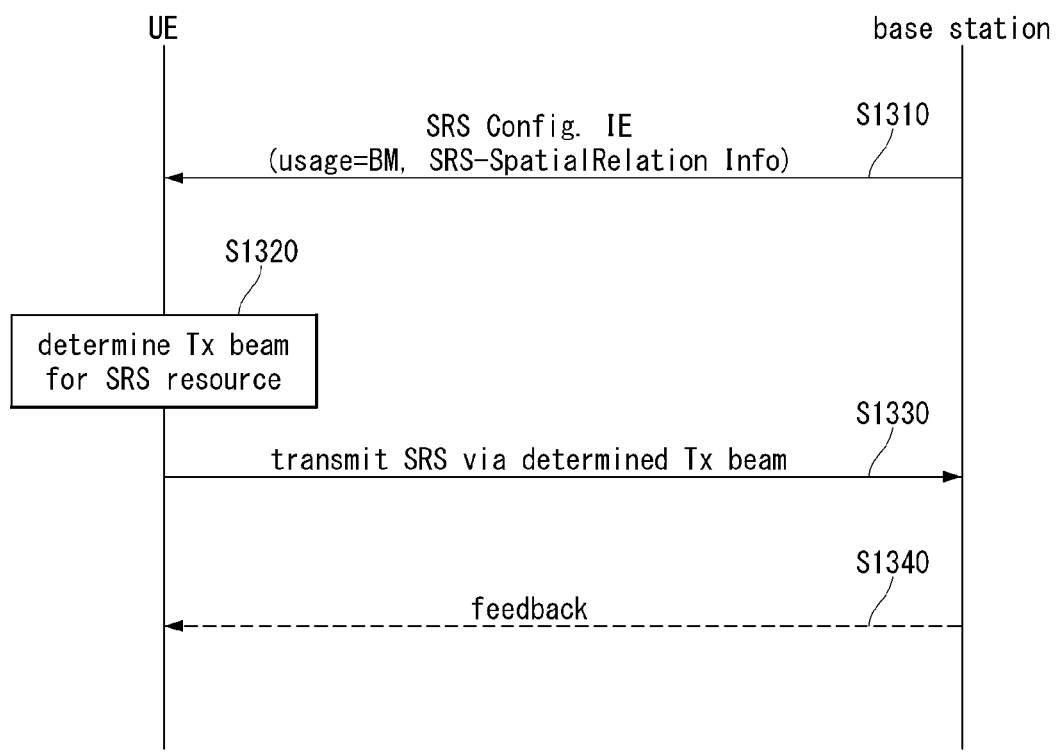
FIG. 13 is a flowchart illustrating an example UL BM procedure using an SRS.

FIG. 13 is a flowchart illustrating an example UL BM procedure using an SRS.

First, the UE receives, from the base station, RRC signaling (e.g., SRS-Config IE) including the (higher layer parameter) usage parameter set to 'beam management' (S1310).

Table 6 shows an example of SRS-Config IE (Information Element), and SRS-Config IE is used for SRS transmission configuration.

The SRS-Config IE includes a list of SRS-Resources and a list of SRS-ResourceSets.

Each SRS resource set means a set of SRS-resources.

The network triggers transmission of the SRS resource set using the configured aperiodicSRS-ResourceTrigger (L1 DCI).

TABLE 6

```
ASN1START
TAG-MAC-CELL-GROUP-CONFIG-START
SRS-Config ::=                                SEQUENCE {
srs-ResourceSetToReleaseList                      SEQUENCE (SIZE(1..maxNrofSRS-ResourceSets))
OF SRS-ResourceSetId                          OPTIONAL, -- Need N
srs-ResourceSetToAddModList                       SEQUENCE (SIZE(1..maxNrofSRS-
ResourceSets)) OF SRS-ResourceSet                 OPTIONAL, -- Need N
srs-ResourceToReleaseList                         SEQUENCE (SIZE(1..maxNrofSRS-Resources)) OF
SRS-ResourceId                                OPTIONAL, -- Need N
srs-ResourceToAddModList                          SEQUENCE (SIZE(1..maxNrofSRS-Resources))
OF SRS-Resource                               OPTIONAL, -- Need N
tpc-Accumulation                              ENUMERATED
{disabled}                                                OPTIONAL, -- Need S
...
}
SRS-ResourceSet ::=                           SEQUENCE {
srs-ResourceSetId                             SRS-ResourceSetId,
srs-ResourceIdList                            SEQUENCE (SIZE(1..maxNrofSRS-
ResourcesPerSet)) OF SRS-ResourceId               OPTIONAL, -- Cond Setup
resourceType                                  CHOICE {
aperiodic                                     SEQUENCE {
aperiodicSRS-ResourceTrigger                  INTEGER (1..maxNrofSRS-TriggerStates-1),
csi-RS                                        NZP-CSI-RS-
ResourceId                                                OPTIONAL, -- Cond NonCodebook
slotOffset                                    INTEGER
(1..32)                                                   OPTIONAL, -- Need S
...
},
semi-persistent                               SEQUENCE {
associatedCSI-RS                              NZP-CSI-RS-
ResourceId                                                OPTIONAL, -- Cond NonCodebook
...
},
periodic                                      SEQUENCE {
associatedCSI-RS                              NZP-CSI-RS-
ResourceId                                                OPTIONAL, -- Cond NonCodebook
...
}
},
```

TABLE 6-continued

```
usage                                 ENUMERATED {beamManagement, codebook,
  nonCodebook, antennaSwitching},
alpha                                 Alpha
        OPTIONAL, -- Need S
p0                                    INTEGER (-
202..24)                                                      OPTIONAL, -- Cond Setup
pathlossReferenceRS                        CHOICE {
ssb-Index                                  SSB-Index,
csi-RS-Index                               NZP-CSI-RS-ResourceId
SRS-SpatialRelationInfo ::=           SEQUENCE {
servingCellId                         ServCellIndex
        OPTIONAL,  -- Need S
referenceSignal                            CHOICE {
ssb-Index                                  SSB-Index,
csi-RS-Index                               NZP-CSI-RS-ResourceId,
srs                                        SEQUENCE {
resourceId                                 SRS-ResourceId,
uplinkBWP                                  BWP-Id
}
}
}
}
SRS-ResourceId ::=                    INTEGER (0..maxNrofSRS-Resources-1)
```

In Table 6, usage refers to a higher layer parameter to indicate whether the SRS resource set is used for beam management or is used for codebook-based or non-codebook-based transmission.

The usage parameter corresponds to L1 parameter 'SRS-SetUse'.

'spatialRelationInfo' is a parameter indicating a configuration of spatial relation between reference RS and target SRS.

Here, the reference RS may be SSB, CSI-RS, or SRS which corresponds to L1 parameter 'SRS-SpatialRelation-Info'.

The usage is configured per SRS resource set.

The UE determines the Tx beam for the SRS resource to be transmitted based on the SRS-SpatialRelation Info included in the SRS-Config IE (S1320).

Here, the SRS-SpatialRelation Info is configured per SRS resource and indicates, per SRS resource, whether to apply the same beam as the beam used for SSB, CSI-RS, or SRS.

Further, SRS-SpatialRelationInfo may be configured, or not, in each SRS resource.

If the SRS-SpatialRelationInfo is configured in the SRS resource, the same beam as the beam used for SSB, CSI-RS or SRS is applied for transmission.

However, unless the SRS-SpatialRelationInfo is configured in the SRS resource, the UE arbitrarily determines the Tx beam and transmits the SRS via the determined Tx beam (S1330).

More specifically, for the P-SRS in which 'SRS-ResourceConfigType' is set to 'periodic,'

(1) Where SRS-SpatialRelationInfo is set to 'SSB/PBCH,' the UE transmits the corresponding SRS resource using the same (or generated from the corresponding filter) spatial domain transmission filter as the spatial domain Rx filter used for reception of the SSB/PBCH.

Or, (2) where SRS-SpatialRelationInfo is set to 'CSI-RS,' the UE transmits the SRS resource with the same spatial domain transmission filter as used to receive the periodic CSI-RS or SP CSI-RS.

Or, (3) where SRS-SpatialRelationInfo is set to 'SRS,' the UE transmits the SRS resource using the same spatial domain transmission filter as used to transmit the periodic SRS.

Even when 'SRS-ResourceConfigType' is set to 'SP-SRS' or 'AP-SRS,' the foregoing may apply.

Additionally, the UE may receive, or not, feedback on the SRS, from the base station, as in the following three cases (S1540).

First, if the Spatial_relation_Info is configured in all the SRS resources in the SRS resource set, the UE transmits the SRS with the beam indicated by the base station.

For example, if all the Spatial_Relation_Info's indicate the same SSB, CRI, or SRI, the UE repeatedly transmits the SRS with the same beam.

This case corresponds to FIG. 4a as the usage for the base station to select the Rx beam.

Second, the Spatial_Relation_Info may be configured in none of the SRS resources in the SRS resource set.

In this case, the UE may perform transmission while freely changing SRS beams.

That is, this case corresponds to FIG. 4b as the usage for the UE to select the Tx beam.

Last, the Spatial_Relation_Info may be configured in only some SRS resources in the SRS resource set.

In this case, for the SRS resources with the Spatial_Relation_Info configured, the SRS may be transmitted with the indicated beam and, for the other SRS resources with no Spatial_Relation_Info configured, the UE may arbitrarily apply the Tx beam and perform transmission.

Next, the TCI of downlink control information (DCI) is described in greater detail.

In the signaling mechanism for association between the DL RS index (e.g., CRI, SSB index) and the indicator state, explicit signaling similar to LTE PQI (included in PDSCH RE Mapping and Quasi-Co Location Indicator field, DCI format 2D) needs to be defined.

Here, each PQI state is explicitly specified by RRC signaling.

Further, it needs to be specified to have the same spatial QCL assumption between PDCCH DMRS and PDSCH DMRS.

In relation thereto, various proposals are described below.

(Proposal 1)

Proposal 1 is to support, at least, an explicit signaling mechanism for associating the DL RS index (e.g., CRI, SSB index) with the indicator state.

Here, the indicator state may be interpreted as having the same meaning as the above-described TCI state.

The implicit determination of the association by the UE may be supported in the future.

Here, the indicator state may include, or not, different parameters.

Here, the different parameters may be parameters for the purpose of mapping PDSCH similar to the PQI in LTE to RE, other QCL parameters.

Joint encoding may be supported in a similar manner to that of LTE to have a better trade-off in terms of DCI overhead and flexibility by properly expanding the N value which is larger than [3 bits].

That is, indication of PDSCH rate matching information that may include the PDSCH start symbol, along with PDSCH beam indication, may be required.

Here, the PDSCH rate matching information may be for providing a beam switching gap and DCI decoding time in a specific case and may include a ZP CSI-RS resource ID for protecting the CSI-RS of the neighboring beams.

(Proposal 2)

Proposal 2 is to support joint encoding between PDSCH beam indication and PDSCH rate matching information so as to reduce DCI overhead.

The configuration of the RS set for each state may be performed via higher layer signaling (e.g., RRC, RRC+MAC CE).

Each indicator state may be updated by the MAC CE to have better efficiency and flexibility in the network implementation.

(Proposal 3)

Proposal 3 supports the ability to perform the configuration of RS set of each state via RRC+MAC CE as well as RRC.

In relation to the timing when QCL is relatively applied at the time of QCL indication, at least one slot latency or two (a couple of) symbols need to be permitted for a timing gap for precisely decoding the PDCCH to change (or apply) the PDSCH beam according to the PDCCH indication.

Such latency may be applied only for spatial QCL indication, and other QCL parameters, such as delay spread, may be applied to the same slot where the DL grant is transferred.

As set forth above, under the assumption of 1 slot latency for spatial QCL indication, the NR-PDSCH scheduled in slot #n and transmitted is based on the spatial QCL indication provided in the latest slot carrying the TCI field prior to slot #n and is based on other QCL parameters provided in the same slot #n.

That is, in such an operation, when the UE receives the corresponding PDSCH, other at least one QCL parameter(s) than the spatial QCL is applied upon receiving data in the same slot according to an indication by the DL grant received in #n slot (by the TCI field included in the DL grant).

Here, the other, at least one, QCL parameter(s) may include at least one of delay spread, average delay, Doppler spread, or Doppler shift.

For the spatial QCL information alone, the UE does not follow the indication (this indication is applied in #(n+1) slot and/or later) of the DCI (TCI included in the DCI) in #n slot and applies the beam indication (by TCI) in #(n−1) slot (and/or the latest slot including its previous timings).

Further, the latency may rely on UE capability so that the UE may report proper capability for the latency such as two symbols in 1 slot.

In this case, the above-described behavior may be applied to the granularity of symbol unit per UE based on the UE's capability, and one symbol gap in the transmitted PDSCH needs to be applied considering the RF switching time due to a beam change.

In other words, more specifically, if such behavior occurs at the symbol-level (i.e., the spatial QCL indication is applied with the X-symbol latency), the corresponding PDSCH transmission may be performed using at least one of the following options, and the UE receives the same.

(Option 1)

PDSCH transmission may be initiated from the PDSCH start symbol timing (e.g., which may be immediately after the PDCCH region) indicated after the time of reception of the scheduled DCI.

Described is an example in which when the UE receiving the PDSCH has previously reported its required latency value X (e.g., X=5) to the base station via capability signaling (and/or when the base station confirms the value), the PDSCH transmission is performed, mapped over a total of Y symbols (e.g., Y=10).

In this case, such a definition may be made that a Z-symbol (e.g., Z=1 symbol) gap is applied to a specific intermediate position (e.g., X=5th symbol or X-mth symbol position) of the PDSCH transmitted, spanned over Y=10 symbols.

At this time, m may be a positive/negative integer, and the value may be explicitly and/or implicitly determined.

That is, where Y=10, X=5, m=0, and Z=1, the PDSCH may be mapped to, up to, first four symbols among Y=10 symbols, and data may be mapped from the sixth symbol to the tenth symbol, with the fifth symbol completely emptied. In such a manner, RE mapping may be done, and transmission may be performed.

The UE may be defined to clearly recognize the same and receive the PDSCH.

In this case, the DCI downloaded in the nth slot may be defined so that the newly indicated spatial QCL indication information is applied after the gap time, and the PDSCH part before the gap time is received by applying its previous "latest" valid spatial QCL indication information.

Regarding the time of applying (all) other QCL parameters than the spatial QCL parameter, the following two sub options may apply.

The first sub option is a method to apply the TCI information indicated by the DCI transmitted in the nth slot through to the gap time (and to the end of the slot after the gap).

The second sub option is a method to apply the TCI information indicated by the DCI transmitted in the nth slot from the gap time through to the end of the slot and, through to the gap time, apply the same beam as the beam configured in the CORESET where the DCI is transmitted.

The former (i.e., the first sub option) may be more preferable to the system that operates, with the CORESET (PDCCH) beam and data (PDSCH) beam separated from each other.

For example, the former may be regarded as a sort of CoMP operation in which the control channel Tx beam and the data channel Tx beam are separated.

In contrast, the latter (second sub option) may be more preferable to the system in which the CORESET (PDCCH) beam and the data (PDSCH) beam are the same (a sort of fallback transmission) through to the gap time and, after the gap time, a similar operation to the CoMP is applied.

(Option 2)

PDSCH transmission may be defined in such a form that when the UE receiving the PDSCH has previously reported its required latency value X (e.g., X=5) to the base station via, e.g., capability signaling (and/or when the base station confirms the value), PDSCH transmission is initiated from a specific position (e.g., X=5th symbol or X-mth symbol position) after the time of reception of the scheduled DCI, and the RE mapping is maintained through to the end of the slot.

In option 2, since the PDSCH transmission is started from the X-mth symbol position, (all) other QCL parameters including the spatial QCL parameter are applied together from the timing.

In the above proposed operations, the X-m value itself may be configured by the base station (more flexibly, directly) (while referring to, e.g., the capability signaling from the UE).

The foregoing description may be regarded as having assumed the case scenario where the DL grant transmitted implicitly in the nth slot (slot #n) transmits the PDSCH in the same (n+D)th slot (with D=0).

Given the circumstance where D>1, "the PDSCH is transmitted in the (n+D)th slot (with D=1) by the DL grant transmitted in the nth slot" may also be interpreted as a sort of inter-slot scheduling.

The D value itself may be indicated or set to one of the contents of the DCI transmitted in the nth slot directly by the UE.

If the D=1 is indicated directly via the DCI, the foregoing description may be applied, with all delayed to the (n+1)th slot, leaving no issues.

That is, in such a case, all other QCL parameters (including delay spread), as well as the spatial QCL indication, are applied to the PDSCH transmitted in the (n+1)th slot.

Thus, as an additional operation proposed in the disclosure, to further simplify the operation, if a specific QCLed beam indicated by the contents, e.g., TCI field, included in the DCI transmitted in the nth slot is the same as the spatial QCL beam configured in the NR-PDCCH where the DCI has been transmitted (e.g., the state configured in the same way with the same CSI-RS resource ID (or same SS-block time index)), the UE may recognize the same as the D=0 having been indicated implicitly and may be defined to thus receive the PDSCH in the same nth slot.

Indeed, the base station also transmits the PDSCH in the nth slot, and the UE also receives the PDSCH in the same slot.

At this time, the QCL parameters (including spatial QCL) indicated by the TCI state indicated with the DCI in the nth slot all may be applied to the PDSCH transmitted in the nth slot.

Or, if the specific QCLed beam indicated by the contents, e.g., TCI field, included in the DCI transmitted in the nth slot differs the spatial QCL beam configured in the NR-PDCCH where the DCI has been transmitted (e.g., the state in which they have been set to differ with different CSI-RS resource IDs (or different SS-block time indexes)), the UE may recognize that a non-zero D (e.g., a specific non-zero D value may apply, such as D=1) has been implicitly indicated and may be defined to receive the PDSCH in the (n+D)th slot.

Indeed, the base station also transmits the PDSCH in the nth slot, and the UE also receives the PDSCH in the same slot.

At this time, the QCL parameters (including spatial QCL) indicated by the TCI state indicated with the DCI in the nth slot all are applied to the PDSCH transmitted in the (n+D)th slot.

(Proposal 4)

At least 1 slot latency or two symbols need QCL to be permitted for the timing to be applied relative to the time of QCL indication.

Other QCL parameters such as delay spread may be applied to the same slot in which the DL grant is transferred.

As mentioned above, the spatial QCL relation between reference RS and target RS is an independent feature of the spatial QCL indication for PDSCH reception and, thus, the two indicators need to be split into actually independent DCI fields/formats.

(Proposal 5)

The indicator for spatial QCL relation between reference RS and target RS needs to be supported as a separate/independent DCI field/format as compared with the indicator for spatial QCL indication for PDSCH reception.

The spatial QCL relation between reference RS and target RS is described below.

It is preferable to configure signaling for the spatial QCL relation between SS block (reference) and at least P (periodic)/SP (semi-persistent) CSI-RS via RRC+MAC CE as well as RRC so as to have better efficiency and flexibility in beam control.

Further, allowing AP CSI-RS for the target RS may be supported and this means that beam indication is previously configured by RRC+MAC CE. However, the actual transmission timing of AP CSI-RS is indicated by DCI similarly to the concept of AP CSI-RS of LTE introduced by eFD-MIMO.

It is also preferable to configure signaling for the spatial QCL relation between P/SP CSI-RS resource (reference) and at least other P/SP CSI-RS via RRC+MAC CE as well as RRC so as to have better efficiency and flexibility in beam control.

For the same reasons, permitting AP CSI-RS for the target RS may be supported.

(Proposal 6)

It is preferable to configure signaling for the spatial QCL relation between SS block (reference) and at least P (periodic)/SP (semi-persistent) CSI-RS via RRC+MAC CE as well as RRC.

AP CSI-RS is also allowed for the target RS.

(Proposal 7)

It is also preferable to configure signaling for the spatial QCL relation between P/SP CSI-RS resource (reference) and other P/SP CSI-RS via RRC+MAC CE as well as RRC.

AP CSI-RS is also allowed for the target RS.

The NR-PDCCH beam indication is described below in greater detail.

NR supports NR-PDCCH monitoring using multiple beam pairs to enhance robustness.

Then, if the UE uses a narrow Rx beam, the UE needs to previously be aware which UE beam(s) needs to be applied to receive the NR-PDCCH for higher link robustness.

To that end, a serving beam indication is required as to what TRP(s) Tx beam is used to decode the NR-PDCCH.

As set forth above, the multiple serving beams for monitoring the NR-PDCCH may be configured so that the beam direction of each serving beam may be updated by the beam reporting information, such as the CRI.

For the beam indication for monitoring the UE-specific NR-PDCCH, NR uses MAC CE signaling and RRC signaling.

For example, RRC signaling may be used for configuring one or more time/frequency domain patterns for each serving beam.

MAC CE signaling may be used to indicate the precise beam or pattern information for NR-PDCCH reception.

To monitor the UE-specific NR-PDCCH, MAC CE signaling is not always required.

(Proposal 8)

For NR-PDCCH beam indication, RRC signaling may be used for configuration of one or more time/frequency domain patterns for each serving beam, and MAC CE signaling may be used to indicate the precise beam or pattern information.

Next, UL beam management is described in greater detail.

The base station (e.g., gNB) may configure multiple SRS resource groups that may be used for different purposes.

That is, group A SRS resource may be configured for UL link adaptation, and group B SRS resource may be configured for UL beam management.

When multiple group B SRS resources are configured in the UE for UL beam management, and a single SRS port is configured in each SRS resource, the UE may apply a different Tx beam to each SRS resource.

For example, assuming that the UE configures P group B SRS resources, the UE applies P different beam directions that are individually applied to the different SRS resources.

Here, since the UE is assumed to have different Tx beams, P or its relevant information needs to be initially transferred to the gNB via UE capability signaling for a proper configuration on the group B SRS resource(s).

By configuring/indicating different types of SRIs to indicate the SRS Tx beam after measuring the transmitted group B SRS resource, the gNB selects a preferred beam used for applying to the group A SRS resource.

The SRI for SRS-resource-level Tx beam indication is less limited in payload size than the DCI and, thus, it is preferably signaled by MAC CE.

Further, all error propagations as possible are avoided by receiving an ACK from the UE, and the UL beam information is updated in a relatively long periodicity.

Further, when DL/UL beam correspondence is maintained, the SRS Tx beam is indicated by the SRI or CSI-RS resource-based indication (e.g., CRI).

In the latter case, the UE may determine the SRS Tx beam from the DL Rx beam reversely corresponding to the CRI.

In a similar manner to the SRI for SRS Tx beam, the MAC CE may preferably signal the CRI for the UE Tx beam.

Further, CRI or SRI indication for SRS Tx beam may be limited to group B CSI-RS resource or group B SRS resource to reduce signaling overhead.

(Proposal 9)

For beam indication for SRS transmission, NR supports SRI or CRI indication per SRS configured via MAC CE.

The UE may be configured to transmit multiple SRS resources for UL beam management by a single aperiodic SRS triggering field.

A method for controlling UL beam sweeping may be performed via an explicit or implicit indication.

First, the explicit indication may be performed for whether the UE needs to maintain the same Tx beam or use different SRS Tx beams for different SRS transmission instances.

In contrast, the implicit indication may be performed as the UE maintains the same Tx beam in the SRS resource and defines a default UE behavior to change beams via different SRS resources.

For (UE) Tx beam sweeping (or for U-3 procedure), the UE may be configured to transmit a single SRS resource over multiple OFDM symbols that maintain the same Tx beam during SRS transmission.

For (base station) Rx beam sweeping (for U-2 procedure), multiple 1 symbol SRS resources may be configured in the UE to transmit different Tx beams with different symbols.

For U-1 procedure, multiple N symbol SRS resources may be configured with N larger than 1.

Here, the U-1 procedure means a procedure that simultaneously (jointly) performs the U-2 procedure and the U-3 procedure.

(Proposal 10)

Proposal 10 is to support the UE to lead to UL beam sweeping behavior for SRS transmission according to the following options.

(Option 1): explicit indication (e.g., via DCI and/or MAC-CE)

(Option 2): implicit indication based on SRS configuration

UE maintains the same Tx beam in the SRS resource and changes beams via different SRS resources.

Additionally, what relates to UL-MIMO is described.

NR supports UL-MIMO scheduling by DCI and includes at least some of the following things.

Indication of SRS resource (SRI) transmitted by the UE in the prior time instance Each configured SRS resource is associated with at least one UL Tx beam/precoder.

Transmit rank indicator (TRI)

Values through to the SRS ports configured in the indicated SRI are possible.

Broadband transmission PMI (TPMI)

UL MCS indication

UL HARQ-related information

UL resource allocation

Codebook-based transmission for UL is supported by at least the following signaling in the UL grant:

SRI+TPMI+TRI, where

TPMI is used to indicate a preferred precoder via SRS port in the SRS resource selected by SRI.

Where a single SRS resource is configured, SRI is absent.

TPMI is used to indicate a preferred precoder via SRS port in the single configured SRS resource.

An indication for selection of multiple SRS resources is supported.

Further, the P (periodic)/SP (semi-persistent)/AP (aperiodic) CSI-RS signaling options as shown in Table 7 below are supported.

TABLE 7

| QCL parameter | Reference RS | Target RS | Signaling mode | Reference RS and Target RS should belong to the same CC/BWP or not |
|---|---|---|---|---|
| Spatial | SSB | P CSI-RS | RRC | Can be on different CCs/BWPs |
| Spatial | SSB | SP CSI-RS | SP CSI-RS activation signal | Can be on different CCs/BWPs |
| Spatial | P CSI-RS | Another P CSI-RS | RRC | Can be on different CCs/BWPs |
| Spatial | SSB or P/SP CSI-RS | AP CSI-RS | RRC or RRC + MAC CE for configuration, indication with DCI | Can be on different CCs/BWPs |

Further, NR applies SRS Tx beam indication (by SRS resource or DL RS).

At least, the supported DL RS includes a CSI-RS and an SSB.

NR supports an indication of, at least, spatial relation between DL RS and UL SRS Tx beam via the mechanism shown in Table 8 below.

TABLE 8

| Spatial parameter | Reference RS | Target RS | Signaling mode |
| --- | --- | --- | --- |
| Spatial | SSB/CSI-RS (at least P-CSIRS and SP-CSI-RS), P-SRS | P SRS | RRC |
| Spatial | SSB/CSI-RS(at least P-CSIRS and SP-CSI-RS), P-SRS/SP-SRS | SP-SRS | RRC + MAC-CE |
| Spatial | SSB/CSI-RS (at least P-CSIRS and SP-CSI-RS), P-SRS, SP-SRS, AP-SRS | AP SRS | RRC or RRC + MAC CE for configuration, indication with DCI |

In CC(s) and/or BWP(s), the usage of spatial relation may be considered later.

In Table 8, for the case where Target RS='AP SRS,' SRI field and TRI/TPMI field are included in UL grant.

There may be separately an AP-SRS-Trigger field (similar to LTE). the "(beam) indication with DCI" of the target AP SRS may be interpreted as meaning the DCI by the AP-SRS-Trigger field.

That is, since the SRI field is intended for "PUSCH beam indication," this is irrelevant to the beam indication for Target RS (='AP SRS').

At this time, it may be interpreted as operated or applied as "RRC or RRC+MAC CE for configuration" upon configuring the description of each trigger state.

If such a configuration is made that the AP-SRS-Trigger field is included even in the DL DCI (and/or a separate DCI irrelevant to UL), the above operation may be commonly applied for aligning with such or other type of DCI (e.g., with no SRI field).

At this time, the timeline issue with the time of application in the (beam) indication such as "(AP)-CSI-RS to (AP) SRS" 와 같은 (beam) may follow the "latest indication (before n-X)" rule.

For example, where the specific (AP) SRS is triggered to be transmitted in the nth slot, the (beam) indication regarding an applicable "Reference RS to Target RS" as above, if there is the corresponding (beam) indication downloaded in the latest slot prior to the (n-X)th slot, may follow the same.

Resultantly, providing as long a "buffer" for time of application as X (>=0) slots enables securing implementation flexibility (including complexity reduction) to which beam change/switching is to be applied according to the beam indication when the UE is implemented.

In relation to the usage of spatial relation in the CCs and/or BWPs, if the reference RS for (beam) indication regarding the "Reference RS to Target RS" is configured from a different CC and/or BWP from the Target RS, the timeline issue may be specified (or configured) differently or independently from where the reference RS is configured from the same CC and/or BWP.

For example, where the reference RS is configured and provided from the cross CC (or BWP) and the specific (AP) SRS is triggered to be transmitted in the nth slot, the (beam) indication regarding an applicable "Reference RS to Target RS" as above, if there is the corresponding (beam) indication downloaded in the latest slot prior to the (n-Y)th slot, may follow the same.

Resultantly, providing a "buffer" for time of application which is as long as Y (e.g., Y>X) slots, and different (e.g., larger) from the case of the same CC/BWP enables securing a (larger) implementation flexibility (including complexity reduction) to which beam change/switching is to be applied according to the beam indication when the UE is implemented.

This may be more effective in circumstances that follow inter-cross CC (or BWP) numerology.

This is why a difference may arise in time of application depending on numerology.

The case where the Target RS is 'SRS' has been primarily described above. However, in the case of DL Reference RS to DL Target RS, the timeline issue with time of application in the (beam) indication such as "(AP)-CSI-RS to (AP) CSI-RS" may also follow the "latest indication (before n-X1)" rule.

For example, the (beam) indication regarding "Reference RS to Target RS" applicable when the specific (AP) CSI-RS is triggered to be measured in the nth slot, if there is the corresponding (beam) indication downloaded in the latest slot prior to the (n-X1)th slot, may follow the same.

Resultantly, providing as long a "buffer" for time of application as X1 (>=0) slots enables securing implementation flexibility (including complexity reduction) to which beam change/switching is to be applied according to the beam indication when the UE is implemented.

At this time, if the reference RS for (beam) indication regarding the "Reference RS to Target RS" is configured from a different CC and/or BWP from the Target RS, the timeline issue may be specified (or configured) differently or independently from where the reference RS is configured from the same CC and/or BWP.

For example, where the reference RS is configured and provided from the cross CC (or BWP) and the specific (AP) CSI-RS is triggered to be measured in the nth slot, the (beam) indication regarding an applicable "Reference RS to Target RS" as above, if there is the corresponding (beam) indication downloaded in the latest slot prior to the (n-Y1)th slot, may follow the same.

Resultantly, providing a "buffer" for time of application which is as long as Y1 (e.g., Y1>X1) slots, and different (e.g., larger) from the case of the same CC (or BWP) enables securing a (larger) implementation flexibility (including complexity reduction) to which beam change/switching is to be applied according to the beam indication when the UE is implemented.

This may be more effective in circumstances that follow inter-cross CC (or BWP) numerology.

This is why a difference may arise in time of application depending on numerology.

Another embodiment of the disclosure is described.

First, the following spatial QCL assumption is considered.

Where the UE receives the initial RRC configuration of TCI-StatePDCCH including one or more TCI states but fails to receive one MAC CE activation among the TCI states, the UE assumes that in the UE-specific search space, the DM-RS antenna port associated with PDCCH reception is quasi-co located with the UE SS/PBCH block identified during the initial access procedure in terms of delay spread, Doppler spread, Doppler shift, average delay, and spatial Rx parameter.

If the UE receives the RRC configuration of TCI-StatesPDCCH including a single TCI state, the UE assumes that in the UE-specific search space, the DM-RS antenna port associated with PDCCH reception is quasi-co located with the DL RS(s) configured by the TCI state.

In the above assumptions, only "initial RRC" performed immediately after initial access is specified, but RRC (re-)configuration case(s) is not clearly defined.

Here, RRC (re-)configuration case(s) may mean altering at least one sub RRC parameter for the specific existing CORESET or adding a new CORESET after the initial access (after a specific sufficient time elapses (in the stable RRC-connected state)).

The following is suggested therefor.

The following methods may be taken into consideration between RRC (re)configuration of TCI-StatesPDCCH including multiple TCI states and one MAC CE activation among them.

(Method 1)

The DL RS at the lowest entry of TCI-StatesPDCCH is used in the PDCCH beam until a MAC CE activation message is transferred.

(Method 2)

The latest DL RS activated by the MAC CE in all the existing CORESETs is used the PDCCH beam until a MAC CE activation message is transferred.

If one or more latest activated DL RSs are included in several CORESETs, the DL RS activated in the lowest CORESET is used.

(Method 3)

The UE does not expect (or assume) scheduling via CORESET until a MAC CE activation message is transferred.

That is, until before the MAC CE control is normally complete, the UE does not expect (or assume) arrival of a specific control message, such as data scheduling, via the specific CORESET with the RRC alone configured.

The above-described various proposals (proposals 1 to 10) and embodiments may be performed separately and one or more thereof may be combined together.

Methods of operation by the UE and base station to implement the methods proposed in the disclosure based on what has been described above are described.

Figure 14:
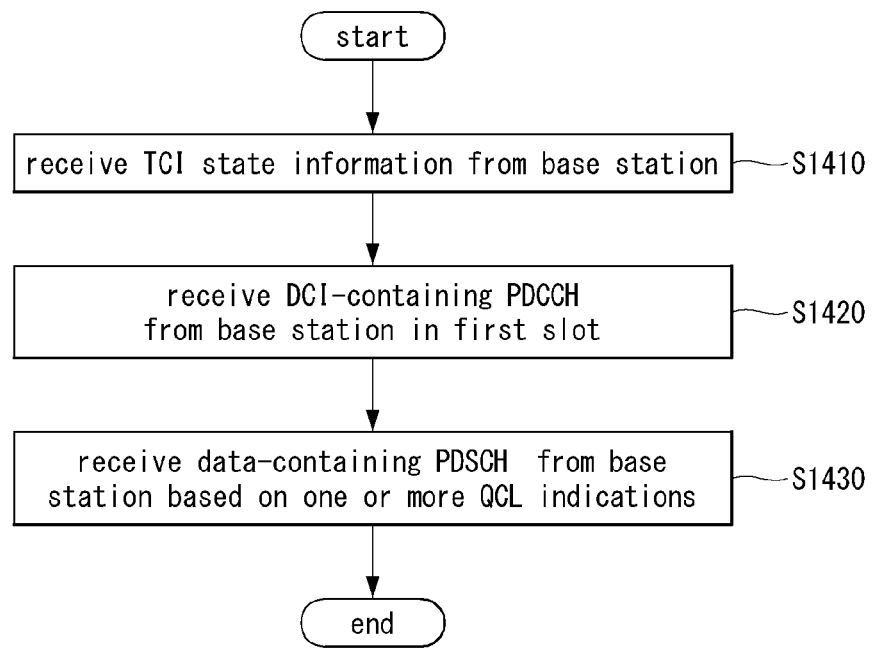
FIG. 14 is a flowchart illustrating an example method of operation by a UE to implement a method as proposed in the disclosure.

FIG. 14 is a flowchart illustrating an example method of operation by a UE to implement a method as proposed in the disclosure.

First, the UE receives transmission configuration indication (TCI) state information related to QCL indication for at least one downlink reference signal (DL RS) from the base station via RRC signaling (S1410).

The UE receives a physical downlink control channel (PDCCH) including downlink control information (DCI) from the base station in a first slot (S1420).

The UE receives, from the base station, a physical downlink shared channel (PDSCH) including the data based on one or more QCL indications (S1430).

Here, among the QCL indications, the spatial QCL indication is a QCL indication included in the PDCCH transmitted in the first slot or the latest slot prior to the first slot and, among the QCL indications, at least one QCL indication except for the spatial QCL indication may be a QCL indication included in the PDCCH transmitted in the first slot.

Here, the latest slot prior to the first slot may be the newest slot before (the first slot-X symbols).

At least one QCL indication except for the spatial QCL indication may include at least one of delay spread, average delay, doppler spread, or Doppler shift.

The X symbols mean a timing gap related to changing of the Rx beam of the PDSCH and the PDCCH decoding.

Additionally, the UE transmits capability information including the X value to the base station.

Here, the step of receiving the data via the PDSCH may further include the step of changing Rx beams for receiving the PDSCH based on the X value.

The X symbols may be configured in the time domain where the PDSCH is received.

Figure 15:
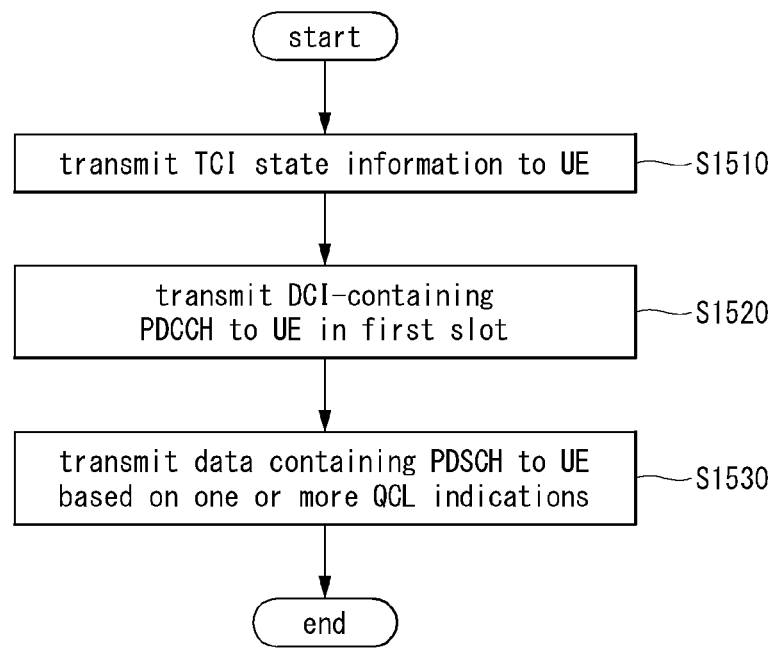
FIG. 15 is a flowchart illustrating an example method of operation by a base station to implement a method as proposed in the disclosure.

FIG. 15 is a flowchart illustrating an example method of operation by a base station to implement a method as proposed in the disclosure.

First, the base station transmits transmission configuration indication (TCI) state information related to QCL indication for at least one downlink reference signal (DL RS) to the UE via RRC signaling (S1510).

The base station transmits a physical downlink control channel (PDCCH) including downlink control information (DCI) to the UE in a first slot (S1520).

The base station transmits, to the UE, a physical downlink shared channel (PDSCH) including the data based on one or more QCL indications (S1530).

Here, among the QCL indications, the spatial QCL indication is a QCL indication included in the PDCCH transmitted in the first slot or the latest slot prior to the first slot and, among the QCL indications, at least one QCL indication except for the spatial QCL indication may be a QCL indication included in the PDCCH transmitted in the first slot.

The latest slot prior to the first slot may be the newest slot before (the first slot-X symbols).

Here, the QCL indications except for the spatial QCL indication may include at least one of delay spread, average delay, doppler spread, or Doppler shift.

The X symbols may mean a timing gap related to changing of the Rx beam of the PDSCH.

Additionally, the base station receives, from the UE, the UE's capability information including information for the timing gap related to changing of Rx beam of PDSCH and PDCCH decoding.

The base station may determine the X value based on the received timing gap information and transmit information for the determined X value to the UE.

The X symbols may be configured in the time domain where the PDSCH is received.

The methods described above in connection with FIGS. 14 and 15 may be specifically implemented via the devices or components therein described below.

Devices to which the Present Disclosure May Apply

Figure 16:
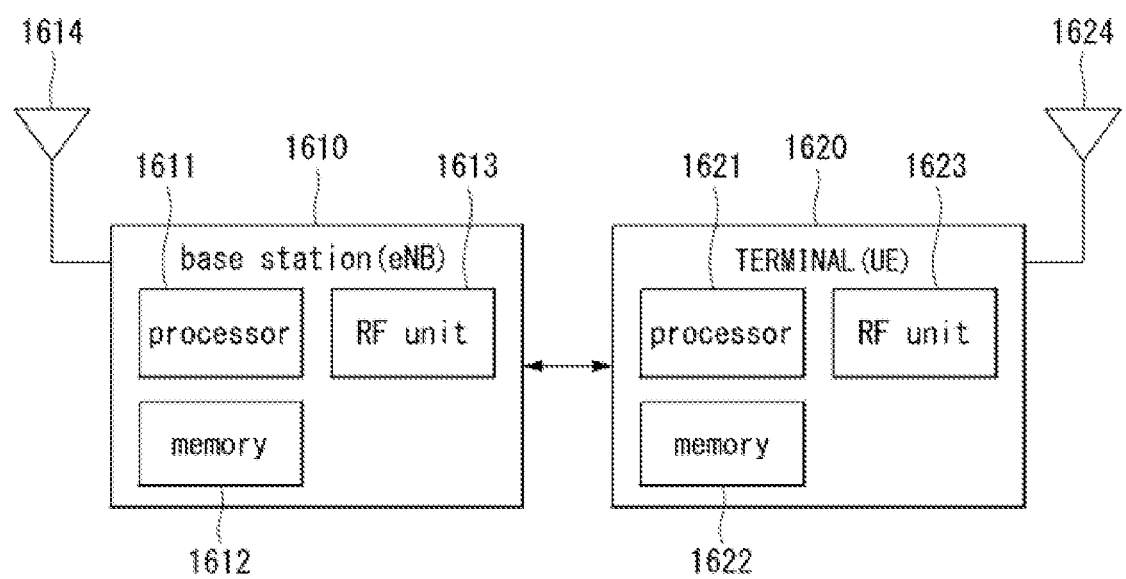
FIG. 16 is a block diagram illustrating a configuration of a wireless communication device to which methods as proposed in the disclosure are applicable.

FIG. 16 is a block diagram illustrating a configuration of a wireless communication device to which methods as proposed in the disclosure are applicable.

Referring to FIG. 16, a wireless communication system includes a base station 1610 and a plurality of UEs 1620 positioned in the coverage of the base station.

The base station and the UE each may be represented as a wireless device.

The base station includes a processor 1611, a memory 1612, and a radio frequency (RF) module 1613. The processor 1611 implements the functions, processes or steps, and/or methods proposed above in connection with FIGS. 1 to 15. Wireless interface protocol layers may be implemented by the processor. The memory is connected with the processor and stores various pieces of information for driving the processor. The RF module is connected with the processor and transmits and/or receives wireless signals.

The UE includes a processor 1621, a memory 1622, and an RF module 1623.

The processor implements the functions, processes or steps, and/or methods proposed above in connection with FIGS. 1 to 15. Wireless interface protocol layers may be implemented by the processor. The memory is connected with the processor and stores various pieces of information for driving the processor. The RF module is connected with the processor and transmits and/or receives wireless signals.

The memory 1612 and 1122 may be positioned inside or outside the processor 1611 and 1621 and be connected with the processor 1411 and 1421 via various known means.

The base station and/or the UE may include a single or multiple antennas.

The antenna 1614 and 1624 functions to transmit and receive wireless signals.

Figure 17:
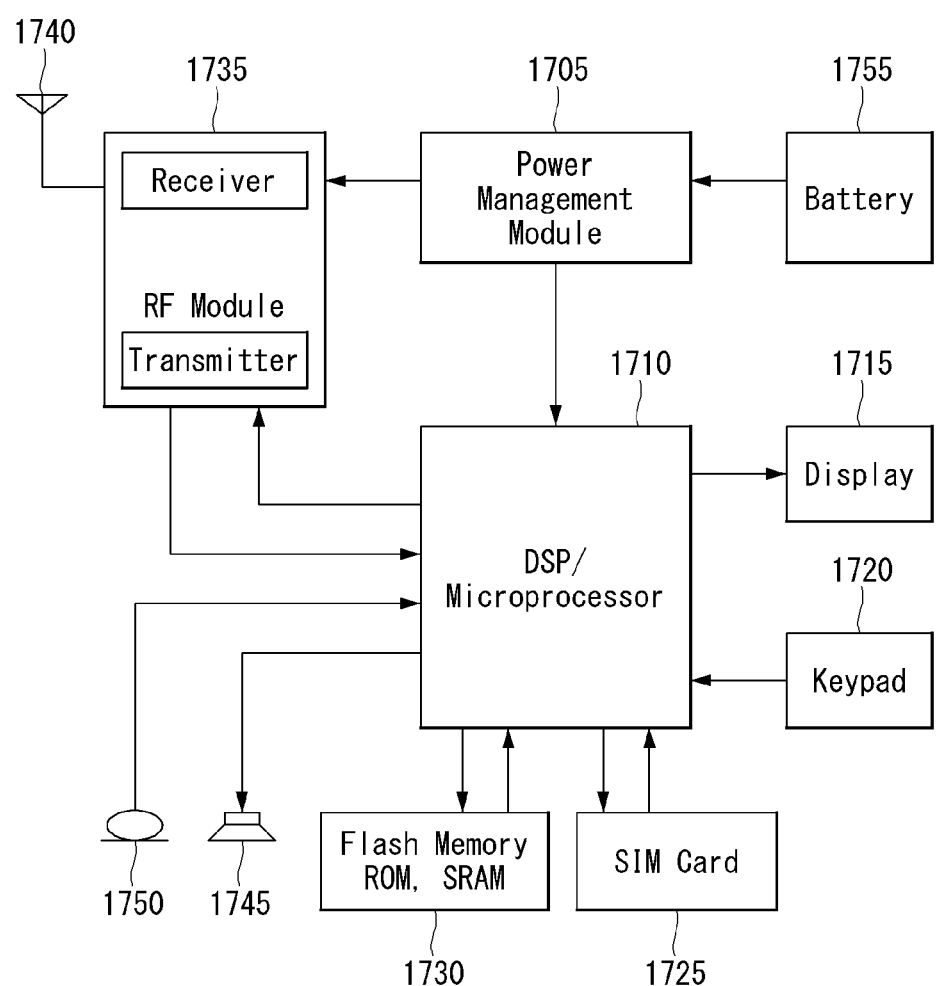
FIG. 17 is a block diagram illustrating a configuration of a communication device according to an embodiment of the disclosure.

FIG. 17 is a block diagram illustrating a configuration of a communication device according to an embodiment of the disclosure.

In particular, FIG. 17 illustrates in greater detail the UE of FIG. 16.

Referring to FIG. 17, the UE may include a processor (or a digital signal processor (DSP)) 1710, an RF module (or RF unit) 1735, a power management module 1705, an antenna 1740, a battery 1755, a display 1715, a keypad 1720, a memory 1730, a subscriber identification module (SIM) card 1725 (which is optional), a speaker 1745, and a microphone 1750. The UE may include a single or multiple antennas.

The processor 1710 implements the functions, processes or steps, and/or methods proposed above in connection with FIGS. 1 to 15. Wireless interface protocol layers may be implemented by the processor.

The memory 1730 is connected with the processor to store information related to the operation of the processor. The memory may be positioned inside or outside the processor and be connected with the processor via various known means.

For example, the user inputs instruction information, e.g., a phone number, by voice activation using the microphone 1750 or by pressing (or touching) a button of the keypad 1720. The processor receives the instruction information and handles performing a proper function, e.g., calling at the phone number. Operational data may be extracted from the SIM card 1725 or the memory 1730. Further, the processor may display the instruction information or operational information on the display 1715 for convenience or user's recognition.

The RF module 1735 is connected with the processor to transmit and/or receive RF signals. The processor transfers instruction information to the RF module to initiate communication, e.g., to transmit a wireless signal constituting voice communication data. The RF module includes a receiver and a transmitter for receiving and transmitting wireless signals. The antenna 1740 functions to transmit and receive wireless signals. Upon receiving a wireless signal, the RF module transfers the signal for processing by the processor and convert the signal into a base-band signal. The processed signal may be converted into readable or audible information output via the speaker 1745.

The above-described embodiments regard predetermined combinations of the components and features of the disclosure. Each component or feature should be considered as optional unless explicitly mentioned otherwise. Each component or feature may be practiced in such a manner as not to be combined with other components or features. Further, some components and/or features may be combined together to configure an embodiment of the disclosure. The order of the operations described in connection with the embodiments of the disclosure may be varied. Some components or features in an embodiment may be included in another embodiment or may be replaced with corresponding components or features of the other embodiment. It is obvious that the claims may be combined to constitute an embodiment unless explicitly stated otherwise or such combinations may be added in new claims by an amendment after filing.

The embodiments of the disclosure may be implemented by various means, e.g., hardware, firmware, software, or a combination thereof. When implemented in hardware, an embodiment of the disclosure may be implemented with, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, an embodiment of the disclosure may be implemented as a module, procedure, or function performing the above-described functions or operations. The software code may be stored in a memory and driven by a processor. The memory may be positioned inside or outside the processor to exchange data with the processor by various known means.

It is apparent to one of ordinary skill in the art that the disclosure may be embodied in other specific forms without departing from the essential features of the disclosure. Thus, the above description should be interpreted not as limiting in all aspects but as exemplary. The scope of the present disclosure should be determined by reasonable interpretations of the appended claims and all equivalents of the present disclosure belong to the scope of the present disclosure.

Industrial Availability

Although the method of transmitting/receiving data in the wireless communication system according to the disclosure has been described in connection with examples in which it applies to 5G systems (new RAT systems), the scheme is also applicable to other various wireless communication systems.

The invention claimed is:

1. A method of receiving data based on a quasi-co location (QCL) in a wireless communication system, the method performed by a user equipment (UE), the method comprising:

receiving, from a base station via radio resource control (RRC) signaling, transmission configuration indication (TCI) state information related to a QCL indication for at least one downlink reference signal (DL RS);

receiving a physical downlink control channel (PDCCH) including downlink control information (DCI) from the base station, wherein a physical downlink shared channel (PDSCH) that includes the data is scheduled based on the DCI; and receiving, from the base station, the PDSCH based on one or more QCL indications included in the DCI, wherein, based on the one or more QCL indications including a spatial QCL indication that represents a first DL RS which is the same as a DL RS configured by a spatial QCL indication for the PDCCH, the PDSCH is scheduled to be transmitted in a same slot as a slot in which the PDCCH is transmitted, and wherein, based on the one or more QCL indications including a spatial QCL indication that represents a second DL RS which is different from the DL RS configured by the spatial QCL indication for the PDCCH, the PDSCH is scheduled to be transmitted in a specific slot that is different from the slot in which the PDCCH is transmitted, and wherein the specific slot is a slot after a specific number of slots from the slot in which the PDCCH is transmitted.

2. The method of claim 1, wherein the first DL RS and the DL RS configured by the spatial QCL indication for the PDCCH are related to (i) a same CSI-RS resource ID or (ii) a same SSB index.

3. The method of claim 1, wherein at least one QCL indication except for the spatial QCL indication includes at least one of delay spread, average delay, Doppler spread, or Doppler shift.

4. A method of transmitting data based on a quasi-co location (QCL) in a wireless communication system, the method performed by a base station, the method comprising:
   transmitting, to a user terminal (UE) via radio resource control (RRC) signaling, transmission configuration indication (TCI) state information related to a QCL indication for at least one downlink reference signal (DL RS);
   transmitting a physical downlink control channel (PDCCH) including downlink control information (DCI) to the UE, wherein a physical downlink shared channel (PDSCH) that includes the data is scheduled based on the DCI; and
   transmitting, to the UE, the PDSCH based on one or more QCL indications included in the DCI,
   wherein, based on the one or more QCL indications including a spatial QCL indication that represents a first DL RS which is the same as a DL RS configured by a spatial QCL indication for the PDCCH, the PDSCH is scheduled to be transmitted in a same slot as a slot in which the PDCCH is transmitted, and
   wherein, based on the one or more QCL indications including a spatial QCL indication that represents a second DL RS which is different from the DL RS configured by the spatial QCL indication for the PDCCH, the PDSCH is scheduled to be transmitted in a specific slot that is different from the slot in which the PDCCH is transmitted, and
   wherein the specific slot is a slot after a specific number of slots from the slot in which the PDCCH is transmitted.

5. The method of claim 4, wherein the first DL RS and the DL RS configured by the spatial QCL indication for the PDCCH are related to (i) a same CSI-RS resource ID or (ii) a same SSB index.

6. The method of claim 4, wherein at least one QCL indication except for the spatial QCL indication includes at least one of delay spread, average delay, doppler spread, or Doppler shift.

7. A UE for receiving data based on a quasi-co location (QCL) in a wireless communication system, the UE comprising:
   a radio frequency (RF) module for transmitting/receiving a radio signal; and
   a processor functionally connected with the RF module, wherein the processor is configured to:
   receive, from a base station via radio resource control (RRC) signaling, transmission configuration indication (TCI) state information related to a QCL indication for at least one downlink reference signal (DL RS);
   receive a physical downlink control channel (PDCCH) including downlink control information (DCI) from the base station, wherein a physical downlink shared channel (PDSCH) that includes the data is scheduled based on the DCI; and
   receive, from the base station, the PDSCH based on one or more QCL indications included in the DCI,
   wherein, based on the one or more QCL indications including a spatial QCL indication that represents a first DL RS which is the same as a DL RS configured by a spatial QCL indication for the PDCCH, the PDSCH is scheduled to be transmitted in a same slot as a slot in which the PDCCH is transmitted, and
   wherein, based on the one or more QCL indications including a spatial QCL indication that represents a second DL RS which is different from the DL RS configured by the spatial QCL indication for the PDCCH, the PDSCH is scheduled to be transmitted in a specific slot that is different from the slot in which the PDCCH is transmitted, and
   wherein the specific slot is a slot after a specific number of slots from the slot in which the PDCCH is transmitted.

8. A base station for transmitting data based on a quasi-co location (QCL) in a wireless communication system, the base station comprising:
   a radio frequency (RF) module for transmitting/receiving a radio signal; and
   a processor functionally connected with the RF module, wherein the processor is configured to:
   transmit, to a user terminal (UE) via radio resource control (RRC) signaling, transmission configuration indication (TCI) state information related to a QCL indication for at least one downlink reference signal (DL RS);
   transmit a physical downlink control channel (PDCCH) including downlink control information (DCI) to the UE, wherein a physical downlink shared channel (PDSCH) that includes the data is scheduled based on the DCI; and
   transmit, to the UE, the PDSCH based on one or more QCL indications included in the DCI,
   wherein, based on the one or more QCL indications including a spatial QCL indication that represents a first DL RS which is the same as a DL RS configured by a spatial QCL indication for the PDCCH, the PDSCH is scheduled to be transmitted in a same slot as a slot in which the PDCCH is transmitted, and
   wherein, based on the one or more QCL indications including a spatial QCL indication that represents a second DL RS which is different from the DL RS configured by the spatial QCL indication for the PDCCH, the PDSCH is scheduled to be transmitted in a specific slot that is different from the slot in which the PDCCH is transmitted, and
   wherein the specific slot is a slot after a specific number of slots from the slot in which the PDCCH is transmitted.

* * * * *